(12) United States Patent
Kobayashi et al.

(10) Patent No.: US 12,412,249 B2
(45) Date of Patent: Sep. 9, 2025

(54) IMAGE PROCESSING APPARATUS, IMAGE PROCESSING METHOD, AND IMAGE CAPTURE APPARATUS

(71) Applicant: CANON KABUSHIKI KAISHA, Tokyo (JP)

(72) Inventors: Satoru Kobayashi, Tokyo (JP); Akane Kanzaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 523 days.

(21) Appl. No.: 18/066,735

(22) Filed: Dec. 15, 2022

(65) Prior Publication Data

US 2023/0196530 A1 Jun. 22, 2023

(30) Foreign Application Priority Data

Dec. 17, 2021 (JP) .................................. 2021-205466
Oct. 18, 2022 (JP) .................................. 2022-167112

(51) Int. Cl.
*G06T 5/50* (2006.01)
*G06T 1/00* (2006.01)
*G06T 5/73* (2024.01)
*G06T 7/33* (2017.01)

(52) U.S. Cl.
CPC .............. *G06T 5/50* (2013.01); *G06T 1/0007* (2013.01); *G06T 5/73* (2024.01); *G06T 7/33* (2017.01); *G06T 2207/10048* (2013.01); *G06T 2207/20221* (2013.01)

(58) Field of Classification Search
CPC ................... G06T 5/00–94; G06T 7/33; G06T 2207/10024; G06T 2207/10048; G06T 2207/20212; G06T 2207/20221
See application file for complete search history.

(56) References Cited

U.S. PATENT DOCUMENTS

| | | | |
|---|---|---|---|
| 2014/0233796 A1* | 8/2014 | Tanaka | G06T 7/248 |
| | | | 382/103 |
| 2015/0334315 A1* | 11/2015 | Teich | H04N 23/11 |
| | | | 348/164 |
| 2015/0358560 A1* | 12/2015 | Boulanger | G06T 5/50 |
| | | | 348/164 |
| 2016/0093034 A1* | 3/2016 | Beck | G06F 18/251 |
| | | | 345/617 |
| 2019/0045139 A1* | 2/2019 | Kurata | H04N 23/76 |
| 2019/0182408 A1* | 6/2019 | Watanabe | G06V 10/143 |
| 2020/0204717 A1* | 6/2020 | Yamamoto | G06T 5/92 |
| 2021/0044736 A1* | 2/2021 | Kaneko | H04N 1/3871 |

(Continued)

FOREIGN PATENT DOCUMENTS

JP 2017157902 A 9/2017

*Primary Examiner* — Sean T Motsinger

(74) *Attorney, Agent, or Firm* — Canon U.S.A., Inc. IP Division

(57) ABSTRACT

An image processing apparatus determines an area in a visible light image where an invisible light image is to be combined and combines the invisible light image with the visible light image based on a determination to generate a combined image. Before combining, the apparatus adjusts the invisible light image so that, in the combined image, a difference between tone information in an area where the invisible light image has been combined and the tone information in an area where the invisible light image has not been combined is equal to or less than a predetermined first threshold.

21 Claims, 22 Drawing Sheets

(56) References Cited

U.S. PATENT DOCUMENTS

| | | | |
|---|---|---|---|
| 2022/0321764 A1* | 10/2022 | Kogure | H04N 23/661 |
| 2023/0196530 A1* | 6/2023 | Kobayashi | G06T 5/50 |
| | | | 382/254 |
| 2023/0214976 A1* | 7/2023 | Wu | G06T 5/60 |
| | | | 382/157 |
| 2024/0085317 A1* | 3/2024 | Zhu | G06V 10/30 |

* cited by examiner

FIG. 2A

| R | IR | R | IR |
|---|----|---|----|
| G | B  | G | B  |
| R | IR | R | IR |
| G | B  | G | B  |

FIG. 2B

| R | G | R | G |
|---|---|---|---|
| G | B | G | B |
| R | G | R | G |
| G | B | G | B |

| IR | IR | IR | IR |
|----|----|----|----|
| IR | IR | IR | IR |
| IR | IR | IR | IR |
| IR | IR | IR | IR |

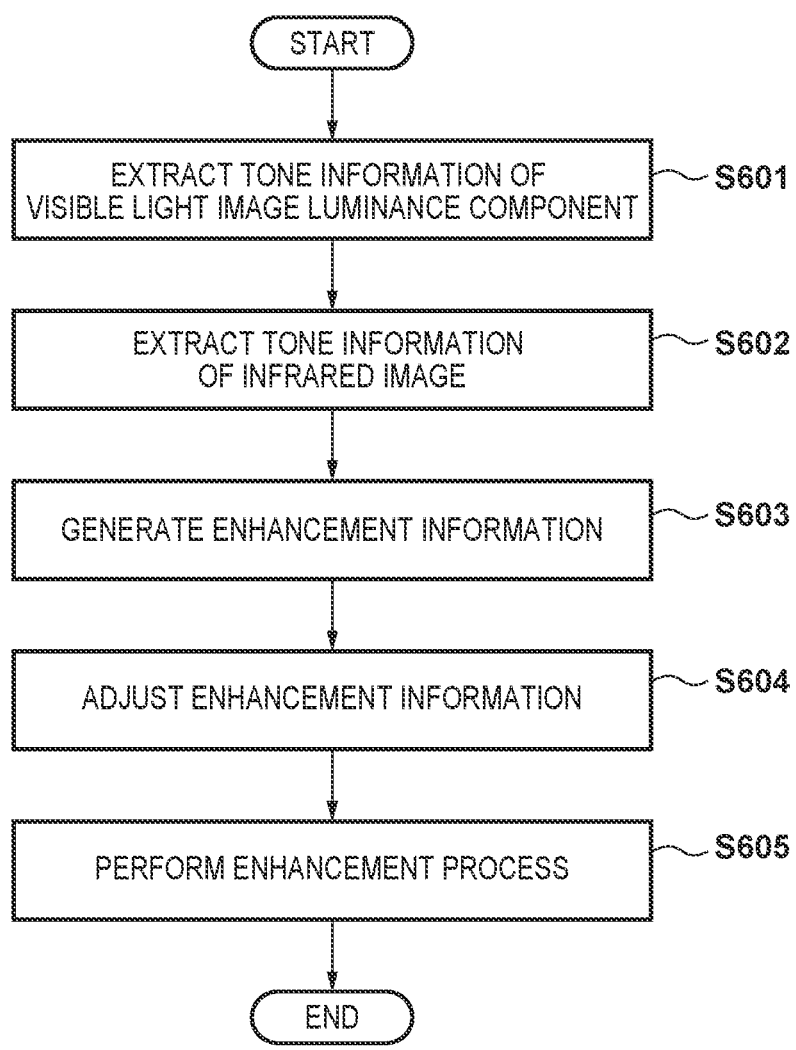

VISIBLE LIGHT IMAGE LUMINANCE COMPONENT

INFRARED IMAGE

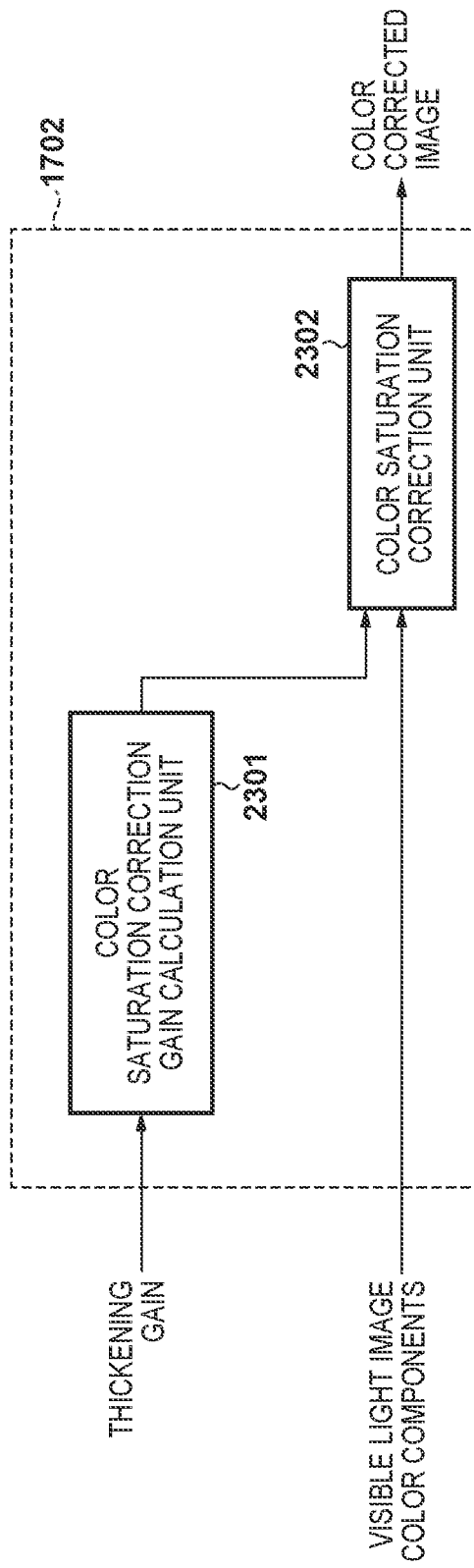

IMAGE PROCESSING APPARATUS, IMAGE PROCESSING METHOD, AND IMAGE CAPTURE APPARATUS

BACKGROUND

Field

The present disclosure generally relates to image processing and, more particularly, to an image processing apparatus, an image processing method, and an image capture apparatus.

Description of the Related Art

A method is known (Japanese Patent Laid-Open No. 2017-157902) that enhances visibility of a visible light image by combining a visible light image capturing a scene with reduced visibility caused by mist or haze with an infrared image capturing the same scene.

In Japanese Patent Laid-Open No. 2017-157902, visibility is enhanced by the tone characteristics in an area with reduced visibility caused by mist being enhanced by combining an infrared image with an area of a visible light image where the mist transmittance is low.

However, when an infrared image is combined with a specific area, the relationship in tone characteristics between the area where the infrared image has been combined and the area where the infrared image has not been combined may produce an unnatural effect.

SUMMARY

In an aspect of the present disclosure, an image processing apparatus and an image processing method are provided that can improve the tone characteristics of a visible light image while suppressing unnaturalness in a relationship in tone characteristics between an area where an invisible light image has been combined and an area where the invisible light image has not been combined.

According to some embodiments, an image processing apparatus can include one or more processors that execute a program stored in a memory and thereby function as: a determining unit configured to determine an area in a visible light image where an invisible light image is to be combined; and a combining unit configured to combine the invisible light image with the visible light image based on the determination to generate a combined image, wherein the combining unit adjusts the invisible light image so that, in the combined image, a difference between tone information in an area where the invisible light image has been combined and the tone information in an area where the invisible light image has not been combined is equal to or less than a predetermined first threshold, and combines the adjusted invisible light image and the visible light image.

According to some embodiments, an image capture apparatus can include an image capturing unit including an image sensor and for acquiring a visible light image and an invisible light image; and an image processing apparatus that uses the visible light image and the invisible light image acquired by the image capturing unit, wherein the image processing apparatus comprising: one or more processors that execute a program stored in a memory and thereby function as: a determining unit configured to determine an area in a visible light image where an invisible light image is to be combined; and a combining unit configured to combine the invisible light image with the visible light image based on the determination to generate a combined image, wherein the combining unit adjusts the invisible light image so that, in the combined image, a difference between tone information in an area where the invisible light image has been combined and the tone information in an area where the invisible light image has not been combined is equal to or less than a predetermined first threshold, and combines the adjusted invisible light image and the visible light image.

According to some embodiments, an image processing method executed by an image processing apparatus can include determining an area in a visible light image where an invisible light image is to be combined; and combining the invisible light image with the visible light image based on the determination to generate a combined image, wherein the combining includes adjusting the invisible light image so that, in the combined image, a difference between tone information in an area where the invisible light image has been combined and the tone information in an area where the invisible light image has not been combined is equal to or less than a predetermined first threshold, and combining the adjusted invisible light image and the visible light image.

According to some embodiments, a non-transitory computer-readable medium storing a program can cause a computer, when executing the program, to function as an image processing apparatus including a determining unit configured to determine an area in a visible light image where an invisible light image is to be combined; and a combining unit configured to combine the invisible light image and the visible light image based on the determination to generate a combined image, wherein the combining unit adjusts the invisible light image so that, in the combined image, a difference between tone information in an area where the invisible light image has been combined and the tone information in an area where the invisible light image has not been combined is equal to or less than a predetermined first threshold, and combines the adjusted invisible light image and the visible light image.

According to some embodiments, an image processing apparatus: can include one or more processors that execute a program stored in a memory and thereby function as: an acquiring unit configured to acquire, based on an invisible light image, information for apply a process to a visible light image corresponding to the invisible light image; and a correcting unit configured to apply the process to the visible light image at a strength based on the information, wherein, in the visible light image to which the process has been applied, when a difference between tone information in an area where a strength of the process is 0 and the tone information in an area where a strength of the process is not 0 is greater than a predetermined fourth threshold, the correcting unit corrects a strength of the process so that the difference is equal to or less than the fourth threshold.

Further features of the present disclosure will become apparent from the following description of exemplary embodiments (with reference to the attached drawings).

BRIEF DESCRIPTION OF THE DRAWINGS

FIGS. 2A and 2B are diagrams illustrating examples of pixel arrangements of an image sensor.

FIG. 6 is a flowchart relating to the operations of the luminance enhancement unit according to the first embodiment.

FIG. 23 is a block diagram illustrating an example of the functional configuration of a color correction unit according to the third embodiment.

DESCRIPTION OF THE EMBODIMENTS

Figure 1:
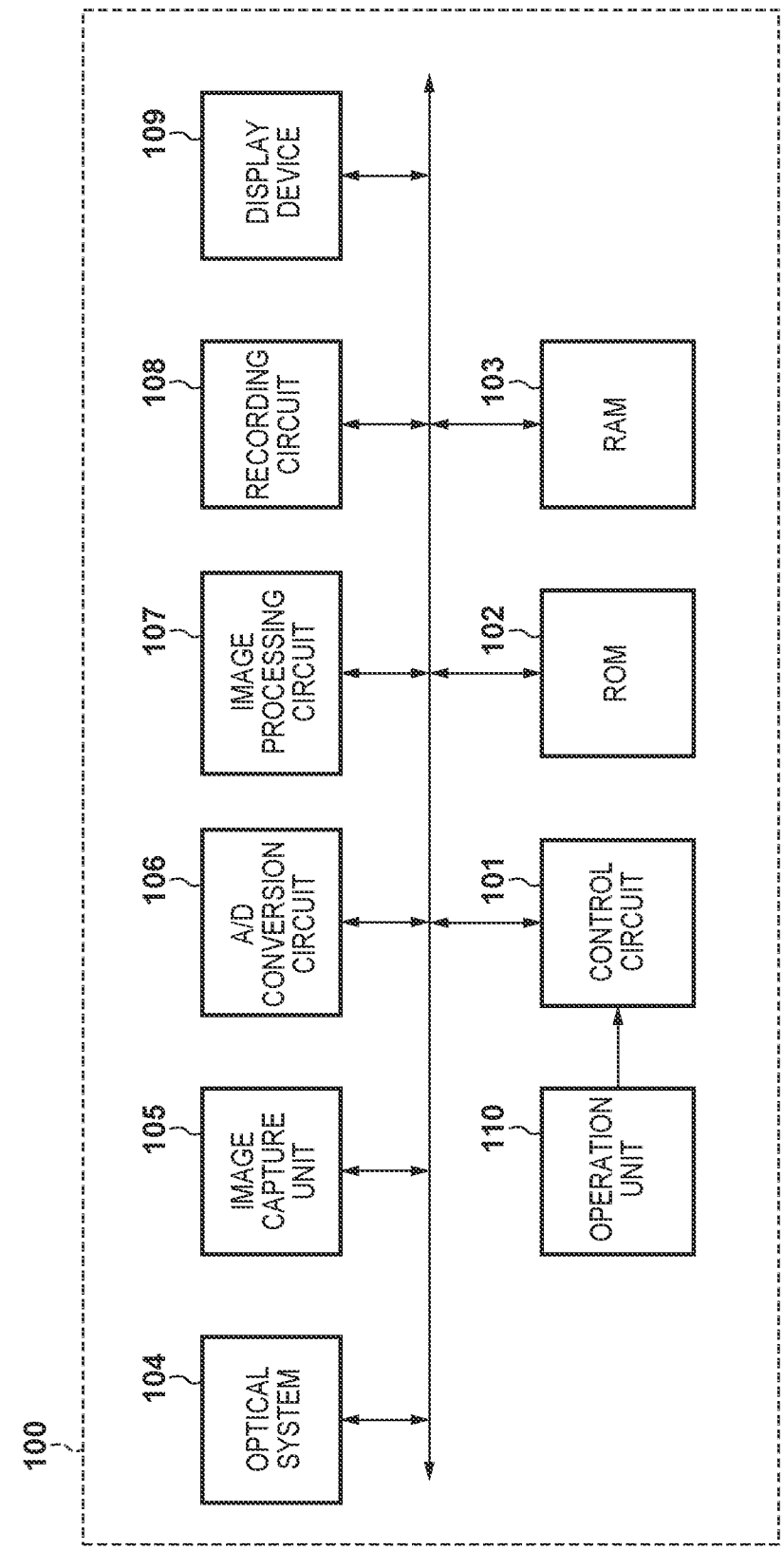
FIG. 1 is a block diagram illustrating an example of the functional configuration of an image capture apparatus functioning as an image processing apparatus according to some embodiments.

Hereinafter, embodiments will be described in detail with reference to the attached drawings. Note, the following embodiments are not intended to limit the scope of the claimed invention. Multiple features are described in the embodiments, but limitation is not made that uses all such features, and multiple such features may be combined as appropriate. Furthermore, in the attached drawings, the same reference numerals are given to the same or similar configurations, and redundant description thereof is omitted.

Note that in the embodiments described below, the present disclosure is embodied as an image capture apparatus such as a digital camera. However, an image capture function is not necessary in the present disclosure, and the present disclosure can be implemented as a discretionary electronic device that can handle image data. Examples of such an electronic device include video cameras, computer devices (personal computers, tablet computers, media players, PDAs, and the like), mobile phones, smartphones, game consoles, robots, drones, and drive recorders. These are only examples, and the present disclosure can be implemented with other electronic devices.

Note that the configurations implemented as blocks in the drawings may be implemented by integrated circuits (IC) such as ASIC and FPGA, by discrete circuits, or by a combination including a memory and a processor that executes a program stored in the memory. Also, one block may be implemented by a plurality of integrated circuit packages or a plurality of blocks may be implemented by a single integrated circuit package. Also, the same block may have a different configuration depending on the operation environment, desired capability, and the like.

First Embodiment

FIG. 1 is a block diagram illustrating an example of the functional configuration of an image capture apparatus 100 representing an example of an image processing apparatus according to the present disclosure. A control circuit 101 is a processor such as a CPU capable of executing a program, for example. By loading a program stored in a ROM 102 on a RAM 103 and executing the program, the control circuit 101 can control the operations of the functional blocks of the image capture apparatus 100 and implement the functions of the image capture apparatus 100. Note that when an optical system 104 is an exchangeable lens unit, the control circuit 101 controls the operations of the optical system 104 via communications with a controller included in the optical system 104.

The ROM 102 is a rewritable non-volatile memory. The ROM 102 stores programs executed by the control circuit 101, various setting values of the image capture apparatus 100, GUI data, and the like. The RAM 103 is a main memory of the control circuit 101. The RAM 103 is used as a working memory of an image processing circuit 107 and loads programs executed by the control circuit 101, stores parameters for executing programs, and the like. Also, one or more areas of the RAM 103 are used as a video memory for storing image data displayed on a display apparatus 109.

The optical system 104 includes an imaging optical system including a lens group that includes movable lenses (zoom lens, focus lens, and the like) and a drive circuit for the movable lenses. The optical system 104 may include a diaphragm and a drive circuit therefor.

An image capture unit 105, for example, may be a known CCD or CMOS color image sensor (image sensor) including a primary color Bayer array color filter. The image sensor includes a pixel array including a plurality of pixels in a two-dimensional array and a peripheral circuit for reading signals from the pixels. The pixels each include a photoelectric conversion element such as a photodiode and accumulate a charge corresponding to the incident light amount in an exposure period. By reading a signal including voltage corresponding to the amount of charge accumulated in the exposure period from each pixel, a pixel signal group (analog image signal) representing a subject image formed on an imaging surface by the imaging optical system is obtained.

Note that in the present embodiment, the image capture unit 105 includes an image sensor capable of capturing visible light images and invisible light images. Such an image sensor, for example, may use one or more of the plurality of pixels included in the pixel array as a pixel for capturing invisible light images. The pixel for capturing invisible light images may be a pixel including an optical filter with characteristics that allow the invisible light wavelength band to pass through but block the visible light wavelength band.

For example, as illustrated in FIG. 2A, with the image sensor provided with a primary color Bayer array color filter, one of the pixels (G pixel) provided with two green (G) filters included as a repeating unit of the color filter can be substituted with a pixel for capturing invisible light images. In this case, interpolation of the value of the G pixel expected to be at the position of the pixel for capturing invisible light images can be performed using the values of other pixels, as with the value of a defect pixel, to generate a visible light image. Also, for an invisible light image, processing can be executed to enlarge an image obtained on the basis of a signal of the pixel for capturing invisible light images to set the resolution (number of pixels) to the same as that of the visible light image.

Note that the method of obtaining a visible light image and an invisible light image is not particularly limited, and another method may be used. For example, as illustrated in FIG. 2B, an image sensor (left) for capturing a visible light image and an image sensor (right) for capturing an invisible light image may be separately provided. In this case, an independent optical system for each image sensor may be provided, or an optical image formed by a single optical system may be allocated to two image sensors via a prism or the like. Also, the invisible light image is an infrared image in the present embodiment but may be an image in a different non-visible wavelength band.

An A/D converter circuit 106 converts an analog image signal read out from the image capture unit 105 into a digital image signal. The A/D converter circuit 106 writes the digital image signal to the RAM 103.

The image processing circuit 107 applies a preset image processing to the digital image signal stored in the RAM 103 and generates a signal or image data according to the application, obtains and/or generates various information, and the like. The image processing circuit 107 may be, for example, a dedicated hardware such as an ASIC designed to realize a specific function or may be configured to realize a specific function via a programmable processor such as a DSP executing a software.

The image processing applied by the image processing circuit 107 includes preprocessing, color interpolation processing, correction processing, detection processing, data modification processing, evaluation value calculation processing, special effects processing, and the like.

The preprocessing includes signal amplification, reference level adjustment, defective pixel correction, and the like.

The color interpolation processing is processing for interpolating values of color components not obtained when shooting, and is also referred to as demosaicing processing.

Correction processing includes various processing including white balance adjustment, tone correction, correction (image restoration) of image degradation caused by an optical aberration in the optical system 104, correction of the effects of vignetting of the optical system 104, color correction, and the like. Also, as described below, an infrared image combining processing (an enhancement process) for the purpose of tone correction of the visible light image is also included in the correction processing.

The detection processing includes processing for detecting a feature area (for example, a face area or a human body area) or movement thereof, processing for recognizing a person, and the like.

The data modification processing includes processing including combining, scaling, encoding and decoding, header information generation (data file generation), and the like.

The evaluation value calculation processing includes processing including generating signals or evaluation values that are used in automatic focus detection (AF), generating evaluation values that are used in automatic exposure control (AE), and the like. Also, as described below, generation of an evaluation value for determining the capture conditions of the infrared image is also included in the processing.

Special effects processing includes processing including adding a blur effect, changing color tone, relighting, and the like.

Note that these are only examples of the processing that can be applied by the image processing circuit 107, and are not intended to limit the processing applied by the image processing circuit 107.

A recording circuit 108, for example, writes data into a storage medium such as a memory card, and reads out recorded data from a storage medium. The storage medium may not be removable. Also, the storage medium may be an external storage device that the recording circuit 108 can communicate with.

The display apparatus 109 is a liquid crystal display, for example, and displays captured images, images read out from the recording circuit 108, information of the image capture apparatus 100, menu screens and other GUIs, and the like. The display apparatus 109 can be made function as an electronic viewfinder (EVF) by continuously performing moving image capture and display of captured moving images on the display apparatus 109. Note that the display apparatus 109 may be a touch display.

An operation unit 110 is a generic term for an input device (buttons, switches, dials, and the like) that is provided for the user to input instructions to the image capture apparatus 100. Each of the input devices constituting the operation unit 110 has a name corresponding to the function assigned to it. For example, the operation unit 110 includes a release switch, a moving image recording switch, a shooting mode selection dial for selecting a shooting mode, a menu button, a directional key, an enter key, and the like. The release switch is a switch for recording a still image, and the control circuit 101 recognizes a half-pressed state of the release switch as an image capture preparation instruction and a fully-pressed state of the release switch as an image capture start instruction. In addition, the control circuit 101 recognizes a press of the moving image recording switch during an image capture standby state as a moving image recording start instruction and a press of the moving image recording switch during the recording of a moving image as a recording stop instruction. Note that the functions assigned to the same input device may be variable. Also, the input device may be software buttons or keys using a touch display.

Figure 3:
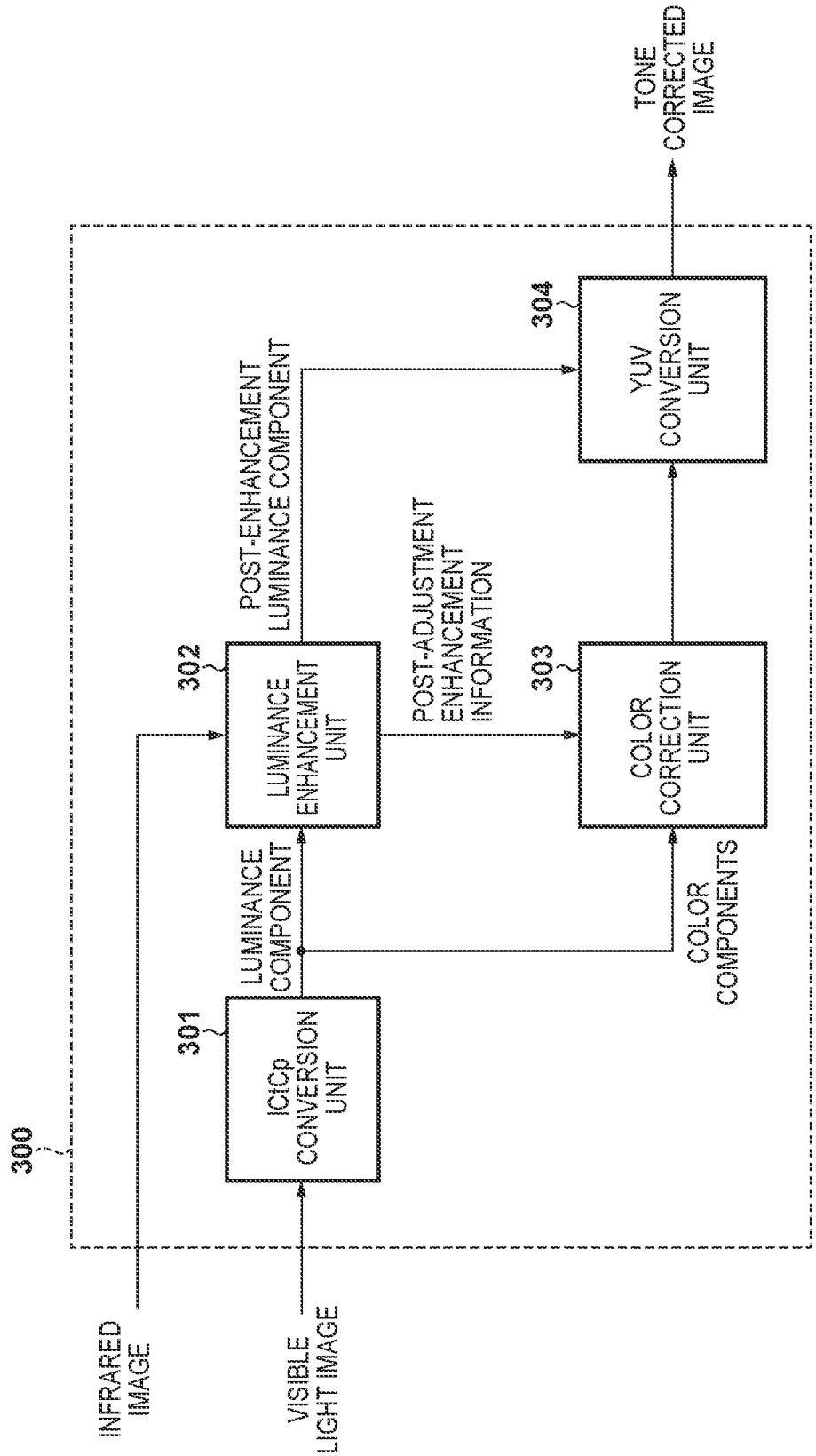
FIG. 3 is a block diagram illustrating an example of the functional configuration of a tone correction unit according to a first embodiment.

FIG. 3 is a functional block diagram for describing the enhancement process executed in the present embodiment and schematically illustrates the image processing circuit 107 when the enhancement process is executed as a tone correction unit 300. However, the functional blocks included in the tone correction unit 300 are actually a portion of the functions implemented by the image processing circuit 107. The tone correction unit 300 includes a ICtCp conversion unit 301, a luminance enhancement unit 302, a color correction unit 303, and a YUV conversion unit 304.

Figure 4:
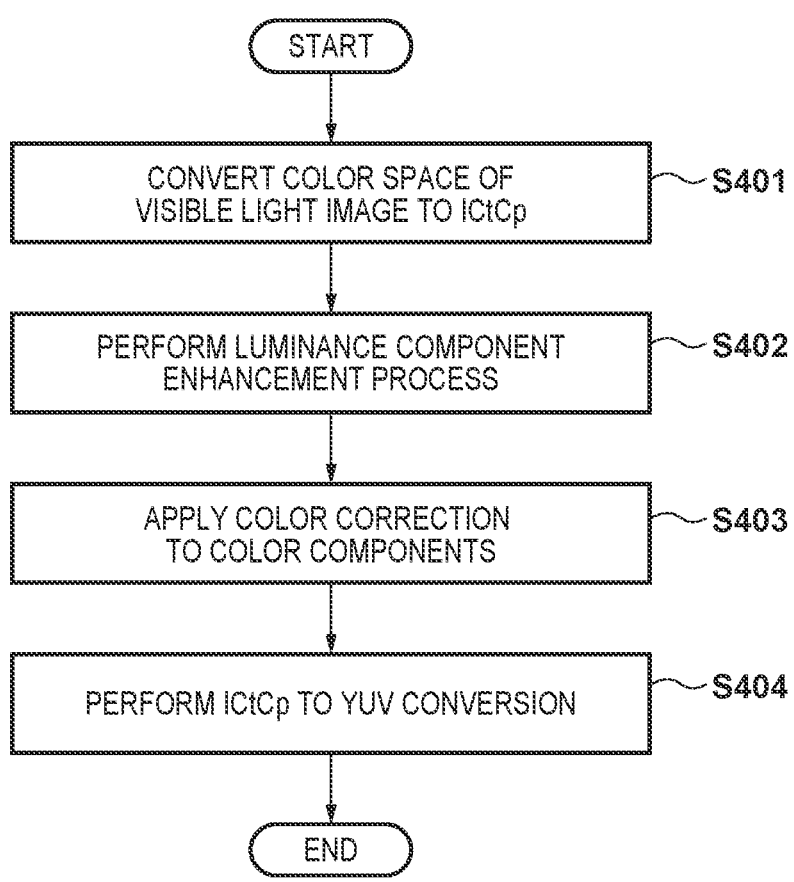
FIG. 4 is a flowchart relating to the operations of the tone correction unit according to the first embodiment.

Next, the enhancement process applied to a visible light image by the tone correction unit 300 will be described using the flowchart of FIG. 4. Here, the visible light image data and the infrared light image data input to the tone correction unit 300 may correspond to data captured by the image capture unit 105 and supplied via the A/D converter circuit 106 or the like or may correspond to data read out from the recording circuit 108. The visible light image data and the infrared light image data used in the enhancement process is image data of the same scene captured at the same time or sufficiently close to the same time.

In step S401, the ICtCp conversion unit 301 converts the color space (for example, YUV color space) of the visible light image data to ICtCp color space. The ICtCp color space is a uniform color space taking into account the human visual characteristics specified by ITU-R BT.2100. The ICtCp conversion unit 301 also separates the visible light image data converted to the ICtCp format into an I component indicating the brightness (luminance) component and Ct and Cp components indicating the color components.

Methods for converting image data in the YUV format and the RGB format into image data in the ICtCp format are known, and thus a detailed description thereof is omitted. Note that data may be converted into the L*a*b color space or other similar uniform color space other than the ICtCp color space. In the case of conversion into the L*a*b format, the data is separated into an L* component and an a*b* component. The ICtCp conversion unit 301 outputs the I component to the luminance enhancement unit 302 and the CtCp component to the color correction unit 303.

In step S402, the luminance enhancement unit 302 combines the infrared light image data with the I component (luminance component) of the visible light image data and improves the tone characteristics (e.g., contrast) of the visible light image data. The luminance enhancement unit 302 outputs the I component obtained via tone correction of the visible light image data to the YUV conversion unit 304. Also, the luminance enhancement unit 302 outputs the adjustment enhancement information used in correction of the color components to the color correction unit 303. The I component obtained via tone correction of the visible light image data is output to the YUV conversion unit 304. The enhancement process executed by the luminance enhancement unit 302 will be described below in detail.

In step S403, the color correction unit 303 applies a color correction processing to the Ct and Cp components (color components) of the visible light image data on the basis of the adjustment enhancement information. The color correction processing executed by the color correction unit 303 will be described below in detail.

In step S404, the YUV conversion unit 304 merges the luminance component obtained via application of the enhancement process in step S402 and the color components obtained via application of the color correction processing in step S403 and obtains image data in the ICtCp format. Then, the YUV conversion unit 304 converts the image data from the ICtCp format into the YUV format. Methods for converting image data in the ICtCp format into image data in the YUV format are known, and thus a detailed description thereof is omitted.

In this example, when the visible light image data in the YUV format is input into the tone correction unit 300, the output post-tone correction visible light image data is also in the YUV format. However, the image data may use a different color space such as the RGB format.

Figure 5:
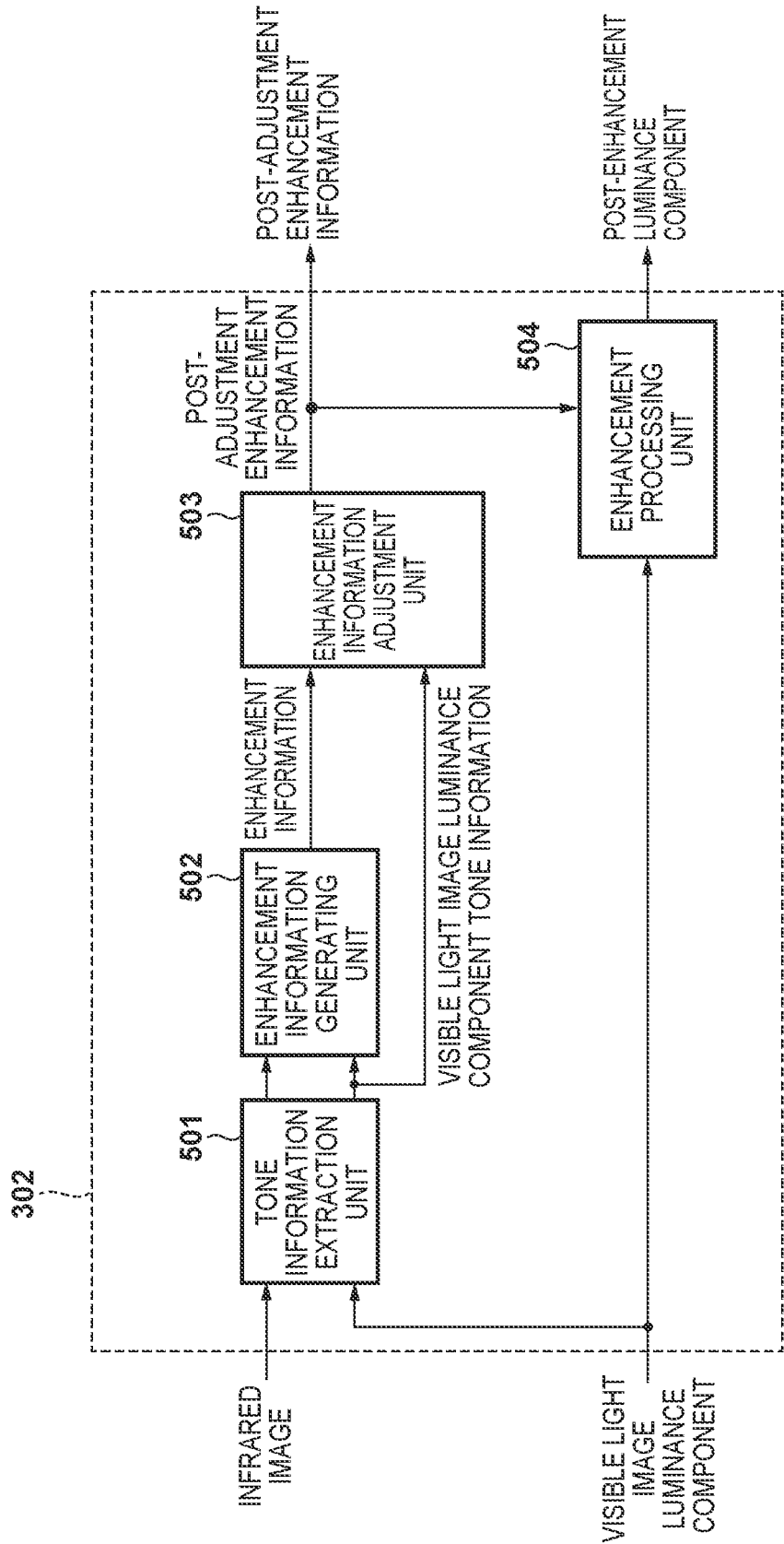
FIG. 5 is a block diagram illustrating an example of the functional configuration of a luminance enhancement unit according to the first embodiment.

Next, the luminance enhancement unit 302 will be described in detail using FIGS. 5 and 6. FIG. 5 is a block diagram illustrating a functional configuration example of the luminance enhancement unit 302. The luminance enhancement unit 302 includes a tone information extraction unit 501, an enhancement information generating unit 502, an enhancement information adjustment unit 503, and an enhancement processing unit 504. These functional blocks are also schematically illustrated functions implemented by the image processing circuit 107.

FIG. 6 is a flowchart relating to the operations of the luminance enhancement unit 302.

In step S601, the tone information extraction unit 501 extracts the tone information of the luminance component (I component) of the visible light image data. Specifically, the tone information extraction unit 501 applies band-pass filter processing to extract a predetermined frequency band and extracts the AC component of the luminance component of the visible light image data as tone information. The tone information extraction unit 501 outputs the tone information to the enhancement information generation unit 502.

In step S602, the tone information extraction unit 501 extracts the tone information of the infrared light image data. Specifically, the tone information extraction unit 501 applies band-pass filter processing to the infrared light image data to extract a predetermined frequency band and extracts the AC component of the infrared light image data as tone information. Note that since the infrared light image data includes only the luminance component, the luminance component does not need to be separated. The tone information extraction unit 501 outputs the tone information to the enhancement information generation unit 502. Also, the tone information extraction unit 501 outputs the tone information of the visible light image also to the enhancement information adjustment unit 503.

Figure 7A:
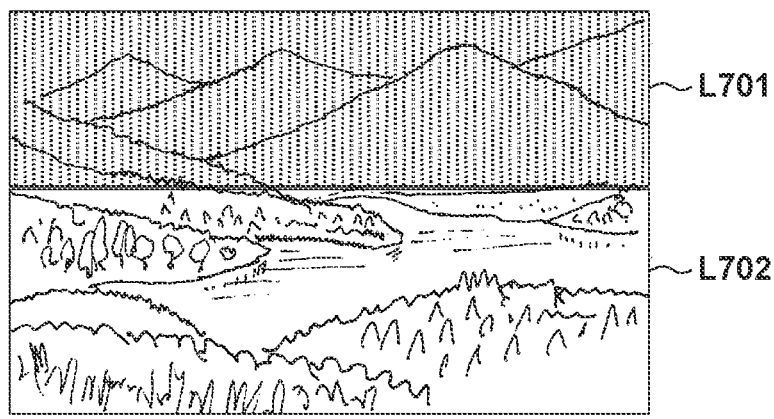
FIGS. 7A and 7B are diagrams illustrating examples of a luminance component of a visible light image and an infrared image capturing the same scene.
Figure 7B:
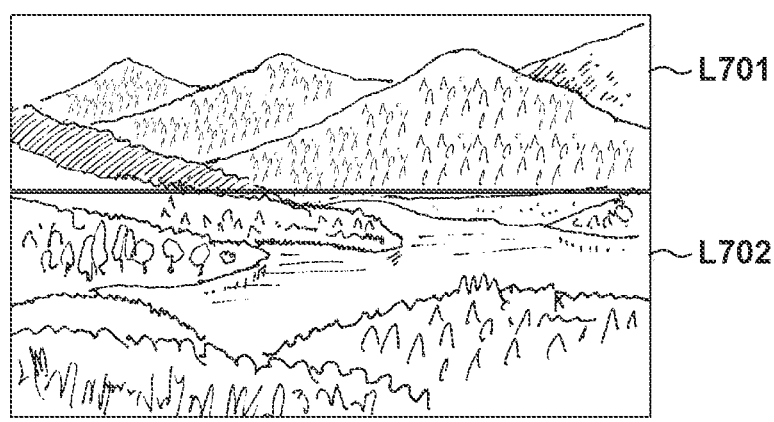

FIG. 7A is a diagram schematically illustrating an example of an image represented by the luminance component of the visible light image data before the enhancement process. FIG. 7B is a diagram schematically illustrating an example of an image represented by the infrared light image data used in the enhancement process of the visible light image data illustrated in FIG. 7A.

In the visible light image (luminance component) illustrated in FIG. 7A, mist, haze, and the like cause degraded tone characteristics in an area L701 in the upper portion. On the other hand, the infrared image illustrated in FIG. 7B tends not to be affected by mist and haze due to be wavelength characteristics of infrared light. Thus, the tone characteristics of the area L701 is better than that in the visible light image. Here, having better tone characteristics is synonymous with having a visually sufficient contrast or dynamic range. The tone information extraction unit 501 applies space band-pass filter processing and extracts the tone information (AC component) from two such images.

The frequency characteristics of the band-pass filter applied in steps S601 and S602 may be dynamically set according to the characteristics of the spatial frequency included in the visible light image (luminance component) and the infrared image. For example, the image size of the image sensor for capturing the infrared image may be larger than the image size of the image sensor for capturing the visible light image. In this case, since the frequency bands extracted from the visible light image data and the infrared light image data are combined, the passband of the band-pass filter applied to the visible light image data can be set to a lower frequency than the passband of the band-pass filter applied to the infrared light image data.

In step S603, the enhancement information generation unit 502 generates enhancement information on the basis of the tone information extracted from the visible light image data (luminance component) and the infrared light image data. The enhancement information is information including a significant value for the area, of the visible light image data (luminance component), where the AC component of the infrared light image data is combined (enhancement process is applied) and not including a significant value for the area of no combination (where the enhancement process is not applied).

Specifically, for the area (low contrast area) with tone information of the visible light image data (luminance component) that is equal to or less than a predetermined threshold, the enhancement information generation unit 502 outputs the tone information extracted from the infrared light image data as the enhancement information. Also, for the area with tone information of the visible light image data (luminance component) that is greater than the predetermined threshold, the enhancement information generation unit 502 outputs a predetermined fixed value (for example, 0) as the enhancement information. Note that the threshold can be empirically determined in advance, for example.

For example, for the area L701 with low contrast in the visible light image (luminance component) illustrated in FIG. 7A, the tone information (AC component) of the area L701 extracted from the infrared light image data is output as the enhancement information. Also, for an area L702, 0 is output as the enhancement information. The enhancement information is information indicating the area in the visible light image to be combined with the infrared image and is also a correction value for correcting the tone characteristics of the visible light image. The enhancement information is output to the enhancement information adjustment unit 503.

For only the areas with insufficient tone characteristics of the visible light image due to haze and the like, the AC component extracted from the infrared light image data is output as the enhancement information. Thus, for areas that do not use tone characteristics enhancement, the tone characteristics of the visible light image is maintained, allowing for unnecessary contrast accentuation to be suppressed.

In step S604, the enhancement information adjustment unit 503 adjusts the enhancement information on the basis of the tone information extracted from the visible light image data (luminance component). The enhancement information adjustment unit 503 outputs the post-adjustment enhancement information to the enhancement processing unit 504 and the color correction unit 303. The method for adjusting the enhancement information will be described below in detail.

In step S605, the enhancement processing unit 504 applies the enhancement process to the luminance component of the visible light image data by adding the post-adjustment enhancement information (AC component of the infrared light image data after adjustment). The enhancement processing unit 504 outputs the post-enhancement-process luminance component to the YUV conversion unit 304.

The enhancement process can be represented by Equation 1 below. In the present specification, the coordinates in the image represented by the image data use the coordinates (x, y) of an XY Cartesian coordinate system.

$$I_{out}(x,y) = \text{EINFadj}(x,y) + I_{in}(x,y) \quad \text{Equation 1}$$

$I_{in}(x, y)$ is the luminance component of the visible light image data before the enhancement process at the image coordinates (x, y), and EINFadj (x, y) is the post-adjustment enhancement information at the coordinates (x, y). Also, $I_{out}(x, y)$ represents the post-enhancement-process luminance component of the visible light image data at the coordinates (x, y).

Note that when the enhancement information is 0, Equation 1 may or may not be used. In the present specification, an area where the enhancement information is 0 is referred to as an area where the enhancement process is not applied, irrespective of whether or not Equation 1 is applied.

The operations of the enhancement information adjustment unit 503 will now be described in detail. As described in relation to FIGS. 7A and 7B, the enhancement information is tone information extracted from the infrared light image data for the low contrast area L701 in the visible light image, with the area L702 that is not low contrast being a fixed value 0.

In this case, the enhancement information adjustment unit 503 determines
(1) the absolute value sum of the tone information extracted from the area corresponding to the area L701 in the visible light image data (luminance component) where the enhancement information is not 0 (the absolute value sum of the tone information of the area in the visible light image where the enhancement process is applied),
(2) the absolute value sum of the tone information extracted from the area corresponding to the area L702 in the visible light image data (luminance component) where the enhancement information is 0 (the absolute value sum of the tone information of the area in the visible light image where the enhancement process is not applied), and
(3) from the enhancement information, the absolute value sum of an area corresponding to the area L701 (the absolute value sum of the tone information of the area in the infrared image used in the enhancement process).

Then, the enhancement information adjustment unit 503 adjusts the enhancement information depending on the relationship between the absolute value sums of the tone information for the area L701 and the area L702. Specifically, the enhancement information adjustment unit 503 determines an adjustment gain for making (i) the sum of (1) and (3) described above equal to (2) or (ii) the difference between (1) and (3) equal to or less than a threshold. In the case of the latter, the threshold can be empirically determined in advance, for example.

The sum of (1) and (3) is the tone information of the area in the post-enhancement-process visible light image (combined image) where the enhancement process has been applied, and (2) is the tone information of the area in the post-enhancement-process visible light image (combined image) where the enhancement process has not been applied. By using the enhancement information corrected using the adjustment gain, for areas in the post-enhancement-process visible light image corresponding to areas where the enhancement process has been applied, unnaturalness of tone characteristics can be suppressed and the visibility or tone characteristics (e.g., contrast) of low contrast areas can be improved.

For example, the adjustment gain is a ratio of the absolute value sums of the tone information and can be determined as follows.

Adjustment gain=((1)+(3))/2

Note that since the area in the visible light image where the enhancement process is applied is a low contrast area, the contribution of (1) in the total of (1) and (3) is small. Thus, the adjustment gain may be determined as follows.

Adjustment gain=(3)/(2)

Note that when the adjustment gain is greater than 1, not only is the tone information of the infrared image enhanced, but the noise component of the infrared image is also enhanced. Thus, a maximum value (>1) may be set for the adjustment gain. When the adjustment gain obtained via the Equation described above is greater than the maximum value, the adjustment gain is set to the maximum value. Note that whether or not the noise component added in the enhancement process is significant depends on the visible light image capture conditions. Thus, the maximum value when the ISO sensitivity when the visible light image is captured is a second sensitivity (greater than a first sensitivity) may be made lower than the maximum value in the case of a first sensitivity. Also, the maximum value when the representative luminance value of the visible light image is a second value (less than a first value) may be made lower than the maximum value in the case of a first value. The representative luminance value may be an average luminance value, for example.

The enhancement information adjustment unit 503, as in Equation 2 below, adjusts the enhancement information by multiplying the enhancement information by the adjustment gain.

$$\text{EINFadj}(x,y)=\text{EINF}(x,y)\times I\_\text{GAIN}(x,y) \quad \text{Equation 2}$$

Here, EINF(x, y) is the enhancement information at the coordinates (x, y), and I_GAIN(x, y) is the adjustment gain at the coordinates (x, y). Also, EINFadj(x, y) is the post-adjustment enhancement information at the coordinates (x, y).

In the example described herein, the adjustment gain is determined so that the absolute value sum of the tone information of the area L702 and the absolute value sum of the tone information of the area L701 are the same value. However, the adjustment gain may be determined using a different method such as determining the adjustment gain so that the difference between the absolute value sum of the tone information of the area L702 and the absolute value sum of the tone information of the area L701 is equal to or less than a threshold.

For example, regarding a specific subject (for example, a person) within the area L701 where the enhancement process is applied and the same type of subject or similar subject within the area L702, the adjustment gain may be determined so that the absolute value sums of the tone information of the subject areas are equal or the difference is equal to or less than a threshold. The specific subject can be detected using a known method using template matching, feature site detection, or the like. Also, areas with similar color and luminance to the specific subject may be detected as a similar subject area.

Furthermore, the enhancement information adjustment unit 503 may change the adjustment gain depending on the magnitude of the value of the enhancement information. For example, when the value of the enhancement information is a small value (for example, greater than 0 but equal to or less than a threshold), this indicates that the contrast of the visible light image of the process area is very low. Thus, the enhancement information adjustment unit 503 may reduce the adjustment gain applied to the enhancement information with a small value. This suppresses the contrast from increasing more than desirable in the area of the subject, which originally has low contrast.

Also, the enhancement information adjustment unit 503 may change the adjustment gain depending on the subject distance. As the distance to the subject increases, the reduction in visibility and contrast due to the effects of haze increases. Thus, the adjustment gain may be changed so that, as the subject distance in the area where the enhancement process is applied increases, the adjustment gain is decreased. In this manner, the visibility or contrast can be enhanced to produce a natural effect as if the haze has decreased.

Figure 8:
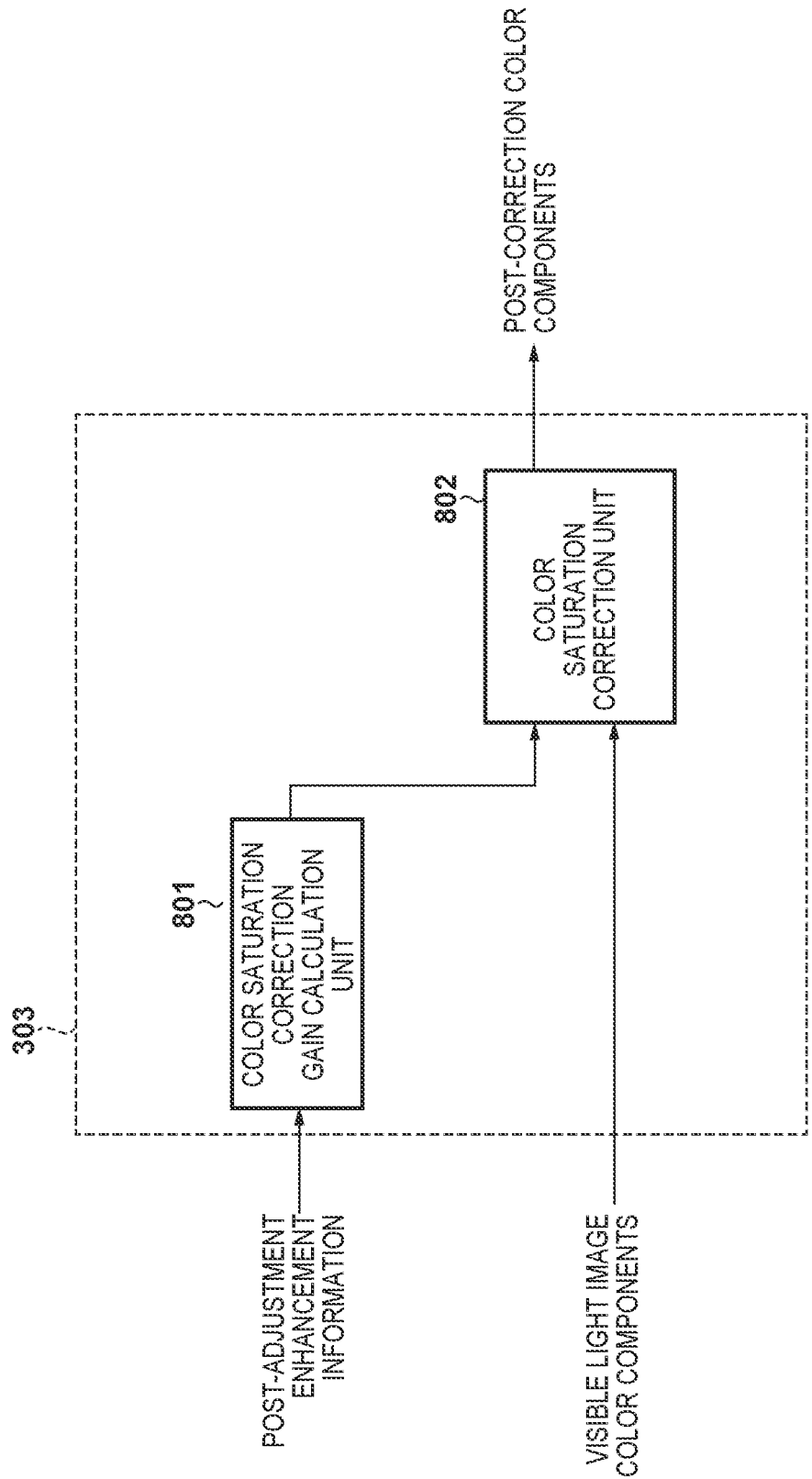
FIG. 8 is a block diagram illustrating an example of the functional configuration of a color correction unit according to the first embodiment.

Next, the color correction unit 303 will be described in detail. FIG. 8 is a block diagram illustrating an example of the functional configuration of the color correction unit 303. The color correction unit 303 includes a color saturation correction gain calculation unit 801 and a color saturation correction unit 802. These functional blocks are also schematically illustrated functions implemented by the image processing circuit 107.

Figure 9:
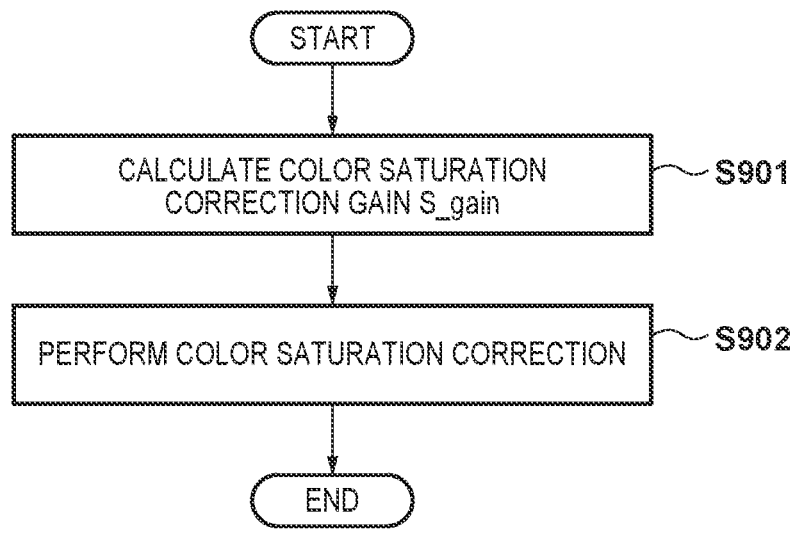
FIG. 9 is a flowchart relating to the operations of the color correction unit according to the first embodiment.

The operations by the color correction unit 303 to correct the color components of the visible light image data using the post-adjustment enhancement information will be described in detail using the flowchart illustrated in FIG. 9.

In step S901, the color saturation correction gain calculation unit 801 determines a color saturation correction gain S_gain using the post-adjustment enhancement information. The operations of the color saturation correction gain calculation unit 801 will be described below in detail.

In step S902, the color saturation correction unit 802 applies color saturation correction processing using the color saturation correction gain S_gain determined in step S901 to the color components of the visible light image data separated in step S401. In this manner, color correction processing suitable for the strength of the enhancement process applied to the luminance component can be applied.

The color saturation correction processing may be as indicated in Equation 3 below, for example.

$$Ct'(x,y)=Ct(x,y)\times S\_\text{gain}(x,y)$$

$$Cp'(x,y)=Cp(x,y)\times S\_\text{gain}(x,y) \quad \text{Equation 3}$$

Here, Ct(x, y) and Cp(x, y) are the signal values of the color components at the image coordinates (x, y) before correction. Also, S_gain(x, y) is the color saturation correction gain at the image coordinates (x, y). Furthermore, Ct'(x, y) and Cp'(x, y) are the signal values of the color components after color saturation correction at the image coordinates (x, y).

Next, the operations of the color saturation correction gain calculation unit 801 will be described in detail. The color saturation correction gain calculation unit 801 can determine the color saturation correction gain corresponding to the post-adjustment enhancement information by referencing a color saturation correction table, for example.

Figure 10:
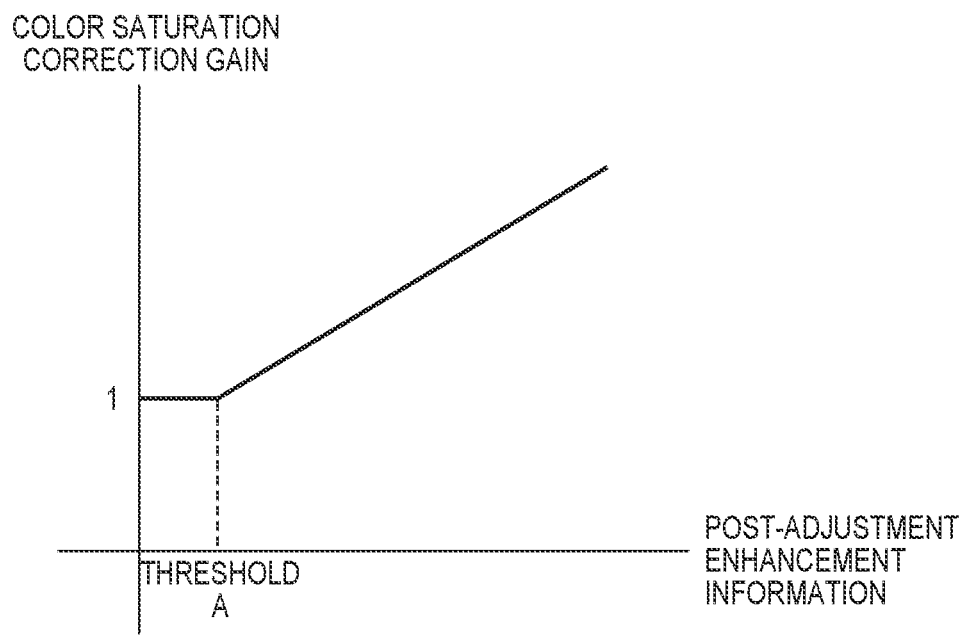
FIG. 10 is a diagram illustrating an example of a color saturation correction gain according to the first embodiment.

FIG. 10 is a diagram using a graph to schematically illustrate the relationship between the post-adjustment enhancement information registered in the color saturation correction table and the color saturation correction gain. The post-adjustment enhancement information obtained in step S604 is represented on the horizontal axis, and the color saturation correction gain is represented on the vertical axis.

For the section where the post-adjustment enhancement information is equal to or less than a predetermined threshold A, the color saturation correction gain is times 1 (×1.0). Also, for the section where the post-adjustment enhancement information is greater than the threshold A, the value of the color saturation correction gain linearly increases as the post-adjustment enhancement information increases. In the color saturation correction table, discrete values of the post-adjustment enhancement information are associated with the color saturation correction gain satisfying the relationship illustrated in FIG. 10 and registered. The color saturation correction gain calculation unit 801 can read out from the table the color saturation correction gain corresponding to the two values closest to the value of the post-adjustment enhancement information and determine the color saturation correction gain corresponding to the value of the post-adjustment enhancement information via linear interpolation. Note that a function may be stored instead of a table.

Note that a table may be used in which the color saturation correction gain corresponding to the absolute value of the difference in the I components before and after application of the enhancement process or corresponding to a ratio thereof are registered instead of the post-adjustment enhancement information.

Also, the color saturation correction gain calculation unit 801 may adjust the color saturation correction gain depending on the exposure conditions when the visible light image is captured. For example, when the image capture sensitivity (ISO sensitivity) is high, the amount of noise in the image increases, causing the value of the post-adjustment enhancement information to increase. Thus, when the image capture sensitivity is equal to or greater than the predetermined threshold, the color saturation correction gain calculation unit 801 may adjust the color saturation correction gain to a value less than the normal value. Accordingly, accentuation of color noise can be suppressed.

Also, the color saturation correction gain may be adjusted taking into account whether or not an infrared auxiliary light is irradiated or how much is irradiated at the time of image capture. When an infrared auxiliary light is irradiated at the time of infrared image capture, the pixel value (value of luminance component) of the infrared image is greater than when an infrared auxiliary light is not irradiated. Thus, the value of the post-adjustment enhancement information is also increased. By preparing a color saturation correction table for when an infrared light is irradiated and for when an infrared light is not irradiated and determining the color saturation correction gain as in Equation 4, a color saturation correction gain taking into account the effects from infrared light irradiation is obtained. Accordingly, appropriate color saturation correction can be performed.

$$S\_gain(x,y) = \alpha1 \times S\_gain\_on(x,y) + (1-\alpha1) \times S\_gain\_off(x,y) \quad \text{Equation 4}$$

Here, S_gain_on(x, y) is a color saturation correction gain for when infrared light is irradiated at the coordinates (x, y). Also, S_gain_off(x, y) is a color saturation correction gain for when infrared light is not irradiated at the coordinates (x, y). Furthermore, α1 is the degree of irradiation of the infrared light and is a value ranging from 0.0 to 1.0. 1.0 is the highest degree of irradiation. For example, the relationship between the subject distance and α1 can be registered in advance, and an α1 corresponding to the subject distance at each coordinate can be used. S_gain(x, y) indicates a color saturation correction gain at the coordinates (x, y).

Also, the color saturation correction gain may be adjusted depending on the subject distance without using infrared light irradiation. A color saturation correction table for both background scene image capture and foreground scene image capture can be prepared, and the color saturation correction gain can be determined as in Equation 5 below. In this manner, color saturation correction can be performed using a color saturation correction gain that is greater when the subject is farther away and smaller when the subject is closer.

$$S\_gain(x,y) = \alpha2 \times S\_gain\_far(x,y) + (1-\alpha2) \times S\_gain\_near(x,y) \quad \text{Equation 5}$$

Specifically, S_gain_far(x, y) is the color saturation correction gain for background scenes. Also, S_gain_near(x, y) is the color saturation correction gain for foreground scenes. Furthermore, α2 indicates the subject distance and is a value ranging from 0.0 to 1.0. 1.0 indicates an infinite distance, for example. Also, S_gain(x, y) is the color saturation correction gain.

Also, to prevent posterization within subject area with the same or similar color after color saturation correction, the color saturation correction gain may be adjusted so that the difference in the correction amount for areas including similar colors is 0 or a value equal to or less than a threshold. Specifically, for a target position in an input visible light image in the tone correction unit 300, a filter weighting is calculated so that weighting is increased the more the signal values are similar, the filter is applied to the color saturation correction gain determined in step S901, and the color saturation correction gain is weighted and smoothed. In this manner, the difference between the correction amounts for areas including similar colors is smoothed. Note that the filter used can be a known filter such as a bilateral filter, for example. Posterization can be suppressed by using such a smoothing process.

According to the present embodiment, the component of the invisible light image to be combined with the visible light image is corrected so that, in the combined image, the difference in the tone characteristics of an area where a component of the invisible light image has been combined and an area where this has not been combined is reduced before combining is performed. Thus, in the combined image, a difference in the tone characteristics between an area where a component of the invisible light image has been combined and an area where this has not been combined producing an unnatural effect can be suppressed, and the visibility and tone characteristics (e.g., contrast) can be enhanced in a localized manner.

Second Embodiment

Next, the second embodiment of the present disclosure will be described. The present embodiment differs from the first embodiment in that contrast correction is performed including also the luminance component of an area of the visible light image where the invisible light image is not combined and in that color saturation correction is performed using a color saturation correction adjustment gain. Note that in the present embodiment, the functional configurations and operations are the same as that in the first embodiment with the exception of that of the image processing circuit 107, and thus the description of the configurations and operations shared with the first embodiment will be simplified.

Figure 11:
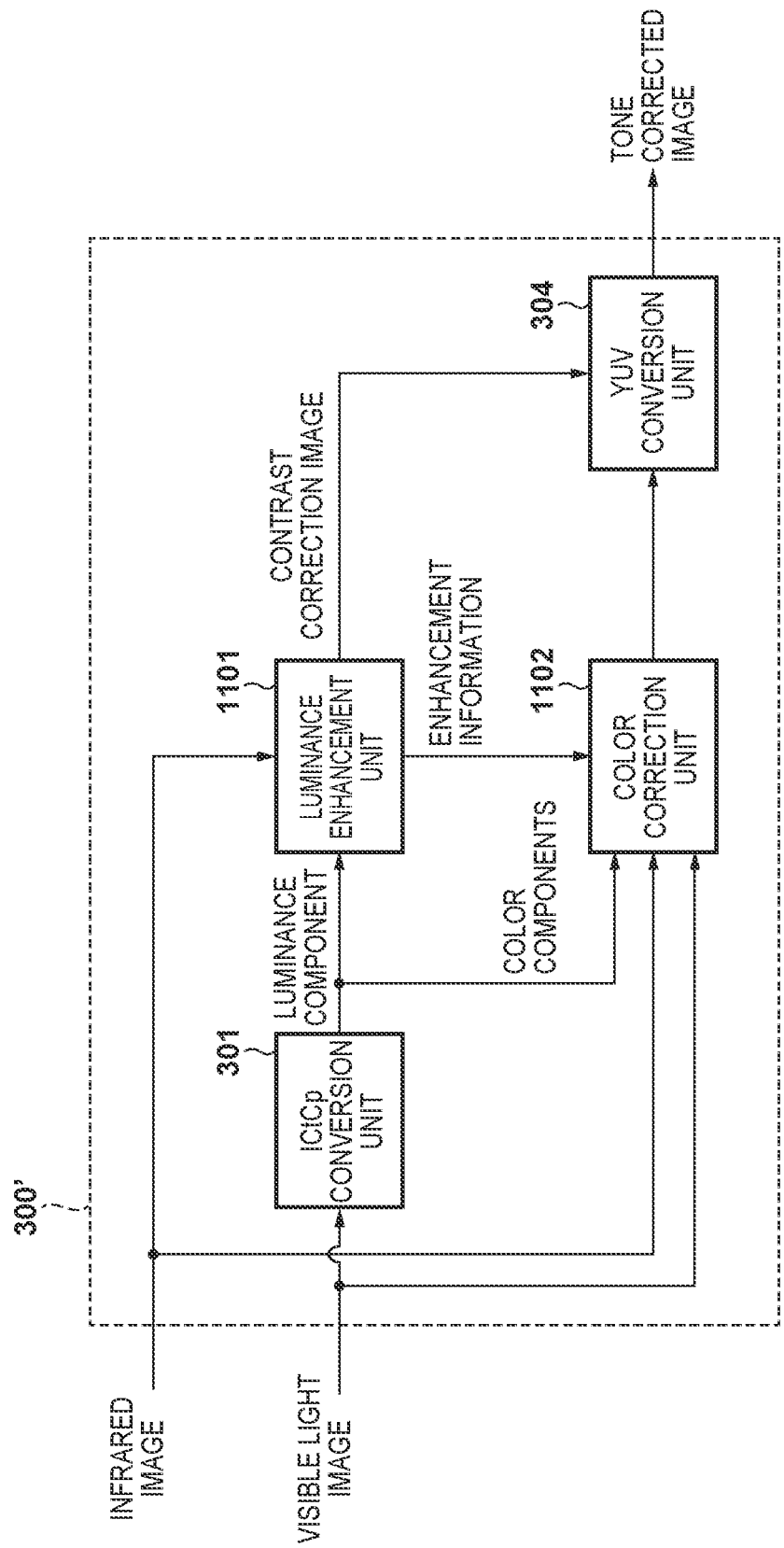
FIG. 11 is a block diagram illustrating an example of the functional configuration of a tone correction unit according to a second embodiment.

FIG. 11 is a functional block diagram for describing the enhancement process executed in the present embodiment and schematically illustrates the image processing circuit 107 when the enhancement process is executed as a tone correction unit 300'. However, the functional blocks included in the tone correction unit 300' are actually a portion of the functions implemented by the image processing circuit 107. The tone correction unit 300' includes the ICtCp conversion unit 301, a luminance enhancement unit 1101, a color correction unit 1102, and the YUV conversion unit 304. In FIG. 11, the functional blocks that are similar to those in the tone correction unit 300 described in the first embodiment are given the same reference numbers used in FIG. 3.

The present embodiment differs from the first embodiment in terms of the operations of the luminance enhancement unit 1101 and the color correction unit 1102. Accordingly, the operations of the luminance enhancement unit 1101 and the color correction unit 1102 will now be described in detail.

Figure 12:
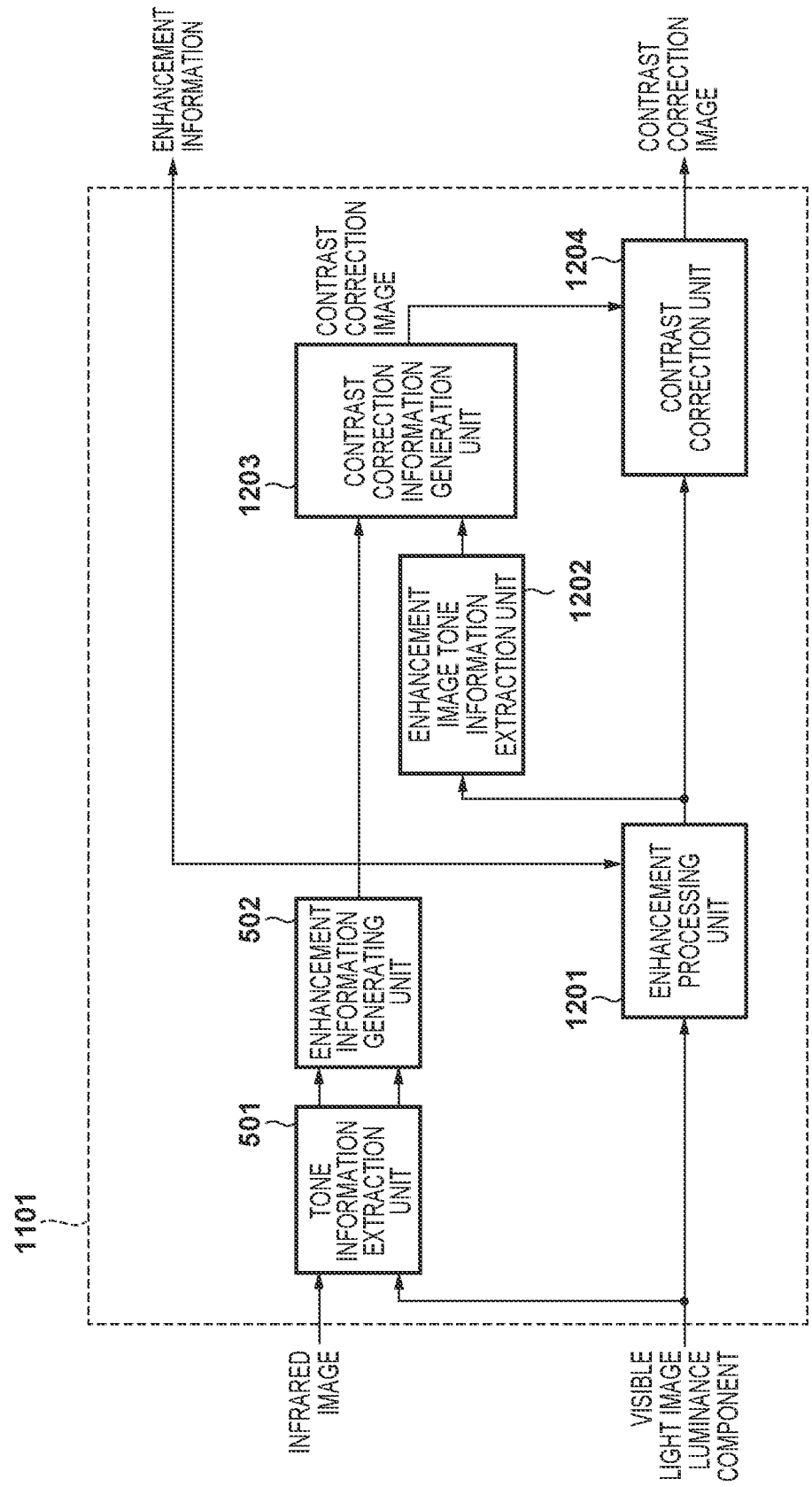
FIG. 12 is a block diagram illustrating an example of the functional configuration of a luminance enhancement unit according to the second embodiment.

FIG. 12 is a block diagram illustrating an example of the functional configuration of the luminance enhancement unit 1101. The luminance enhancement unit 1101 includes the tone information extraction unit 501, enhancement information generation unit 502, an enhancement processing unit 1201, an enhancement image tone information extraction unit 1202, a contrast correction information generation unit 1203, and a contrast correction unit 1204. These functional blocks are also schematically illustrated functions implemented by the image processing circuit 107. Also, in FIG. 12, the functional blocks that are similar to those in the luminance enhancement unit 302 described in the first embodiment are given the same reference numbers used in FIG. 5.

Figure 13:
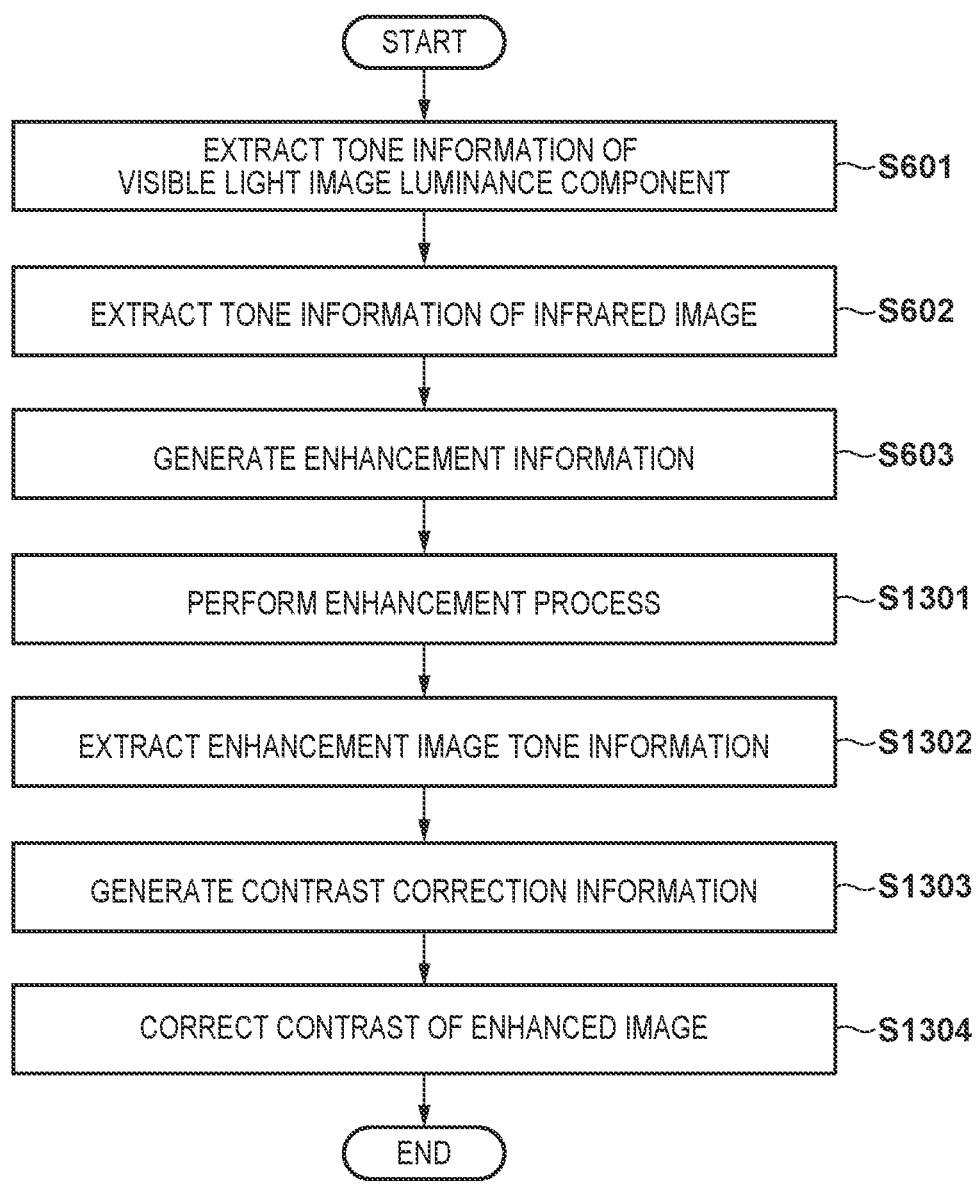
FIG. 13 is a flowchart relating to the operations of the luminance enhancement unit according to the second embodiment.

Next, the operations of the luminance enhancement unit 1101 will be described in detail with reference to the flowchart of FIG. 13. In FIG. 13, the processes for performing operations that are the same as that performed by the luminance enhancement unit 302 of the first embodiment are given the same reference numbers used in FIG. 6.

Steps S601, S602, and S603 are as described in the first embodiment and thus description thereof is omitted. Note that in step S603, the enhancement information generation unit 502 outputs the generated enhancement information to the color correction unit 1102, the contrast correction information generation unit 1203, and the enhancement processing unit 1201.

In step S1301, the enhancement processing unit 1201 applies the enhancement process to the luminance component of the visible light image data. In the present embodiment, the enhancement information used by the enhancement processing unit 1201 is enhancement information generated by the enhancement information generation unit 502 on which the adjustment described in the first embodiment has not been performed. However, the enhancement process applying operations may be the same as in the first embodiment. The luminance component (enhancement image data) on which the enhancement process has been applied is output to the enhancement image tone information extraction unit 1202 and the contrast correction unit 1204.

In step S1302, the enhancement image tone information extraction unit 1202 extracts the tone information of the enhancement image data. Specifically, by applying band-pass filter processing to extract a predetermined frequency band to the enhancement image data, the AC component of the enhancement image data is extracted as tone information.

In step S1303, the contrast correction information generation unit 1203 generates contrast correction information on the basis of the tone information of the enhancement image data and the enhancement information (tone information of the infrared image). The contrast correction information generation unit 1203 outputs the generated contrast correction information to the contrast correction unit 1204. The operations of the contrast correction information generation unit 1203 will be described below in detail.

In step S1304, the contrast correction unit 1204 corrects the contrast of the enhancement image data using the contrast correction information. The contrast correction unit 1204 corrects the contrast of the enhancement image by adding the contrast correction information to the enhancement image as in Equation 6, for example.

$$P_{out}(x,y) = \text{CNTinf}(x,y) + P_{in}(x,y) \qquad \text{Equation 6}$$

Here, $P_{in}(x, y)$ is the pixel value of the enhancement image data at the image coordinates (x, y), and CNTinf(x, y) is the contrast correction information at the image coordinates (x, y). Also, $P_{out}(x, y)$ is the pixel value of the enhancement image data (contrast correction image data) after contrast correction at the image coordinates (x, y). The contrast correction image data is output to the YUV conversion unit 304. The YUV conversion unit 304 generates image data in the YUV format from the color components from the color correction unit 1102 and the contrast correction image data (luminance component) and outputs this as tone-corrected image data.

The operations of the contrast correction information generation unit 1203 will now be described in detail. For the tone information output by the enhancement image tone information extraction unit 1202, the contrast correction information generation unit 1203 determines (4) the absolute value sum of the tone information corresponding to the areas where the enhancement information is not 0, and
(5) the absolute value sum of the tone information corresponding to the areas where the enhancement information is 0.

In the case of the images illustrated in FIGS. 7A and 7B, this means determining the absolute value sum of the tone information of the enhancement image data for the area L701 and the area L702. (4) corresponds to (1)+(3) in the first embodiment, and (5) corresponds to (2) in the first embodiment.

Also, the contrast correction information generation unit 1203 determines the adjustment gain so that (4) and (5) are the same value or the difference between the two is a value equal to or less than a threshold.

For example, the adjustment gain is a ratio of (4) and (5) and can be determined as follows.

Adjustment gain=(4)/(5)

In this manner, the adjustment gain according to the present embodiment can be determined in the same manner as the adjustment gain according to the first embodiment except that the tone information of the post-enhancement-process combined image is not used. In the present embodiment also, a maximum value may be set for the adjustment gain as in the first embodiment.

Also, the contrast correction information generation unit 1203 generates the contrast correction information by multiplying the tone information of the enhancement image data by the adjustment gain as in Equation 7 below.

$$CNTinf(x,y)=TONEinf(x,y) \times CNT\_GAIN(x,y) \quad \text{Equation 7}$$

Here, TONEinf(x, y) is the tone information of the enhancement image data at the image coordinates (x, y), and CNT_GAIN(x, y) is the contrast correction gain at the image coordinates (x, y). Also, CNTinf(x, y) is the contrast correction information at the image coordinates (x, y).

By correcting the tone information of the enhancement image data using the contrast correction gain, contrast correction information with a good balance in terms of the contrast between areas where the enhancement process has been applied and areas where the enhancement process has not been applied can be generated. Thus, in the enhancement image data to which the contrast correction information has been applied, visual incongruity can be suppressed and the visibility and the tone characteristics (e.g., contrast) can be enhanced in a localized manner.

Here, an example has been described in which, for the enhancement image data, the adjustment gain is determined so that the absolute value sum of the tone information of the area (L702) where the enhancement process has not been applied and the absolute value sum of the tone information of the area (L701) where the enhancement process has been applied is the same value. However, the adjustment gain may be determined using a different method such as determining the adjustment gain so that the difference between the absolute value sum of the tone information of the area (L702) where the enhancement process has not been applied and the absolute value sum of the tone information of the area (L701) where the enhancement process has been applied is equal to or less than a threshold.

For example, in the contrast image data, regarding a specific subject (for example, a person) within the area L701 and the same type of subject or similar subject within the area L702, the adjustment gain may be determined so that the absolute value sums of the tone information of the subject areas are equal or the difference is equal to or less than a threshold. The specific subject can be detected using a known method using template matching, feature site detection, or the like. Also, areas with similar color and luminance to the specific subject may be detected as a similar subject area.

Figure 14:
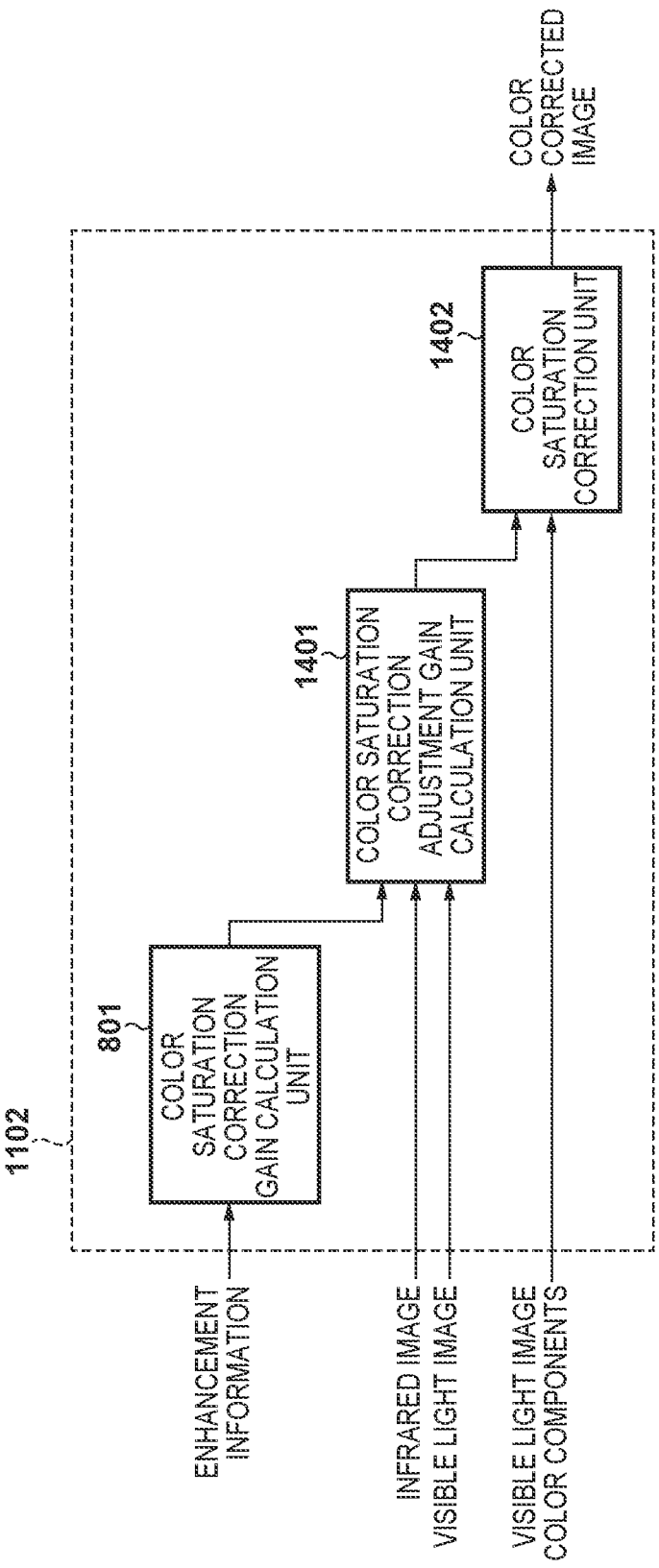
FIG. 14 is a block diagram illustrating an example of the functional configuration of a color correction unit according to the second embodiment.

Next, the color correction unit 1102 will be described in detail. FIG. 14 is a block diagram illustrating an example of the functional configuration of the color correction unit 1102. The color correction unit 1102 includes the color saturation correction gain calculation unit 801, a color saturation correction adjustment gain calculation unit 1401, and a color saturation correction unit 1402. These functional blocks are also schematically illustrated functions implemented by the image processing circuit 107. Also, in FIG. 14, the functional blocks that are similar to those in the color correction unit 303 described in the first embodiment are given the same reference numbers used in FIG. 8.

Figure 15:
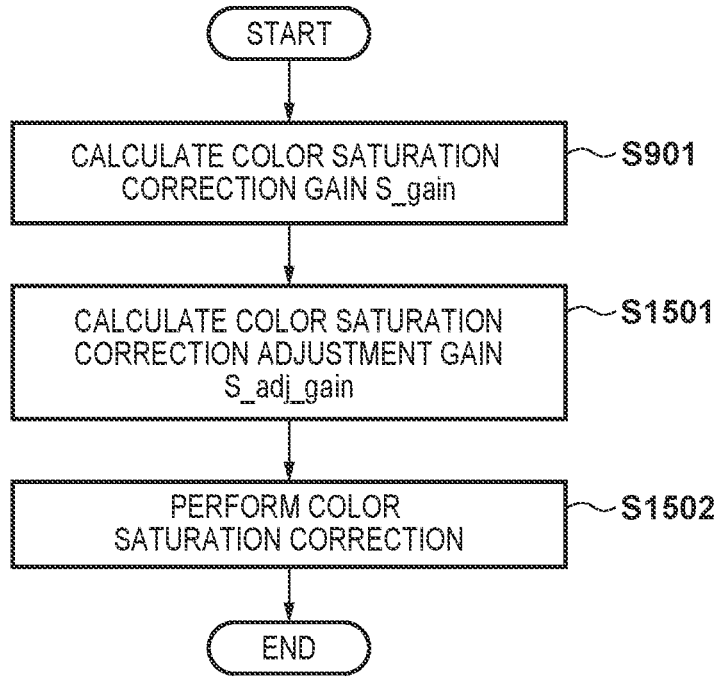
FIG. 15 is a flowchart relating to the operations of the color correction unit according to the second embodiment.

The operations of the color correction unit 1102 will now be described in detail using the flowchart illustrated in FIG. 15. In FIG. 15, the processes for performing operations that are the same as that performed by the color correction unit 303 of the first embodiment are given the same reference numbers used in FIG. 9.

In step S901, the color saturation correction gain calculation unit 801 determines the color saturation correction gain S_gain using the enhancement information. Since the operations of the color saturation correction gain calculation unit 801 may be the same as that of the first embodiment with the exception that the enhancement information is used, a description thereof will be omitted.

In step S1501, the color saturation correction adjustment gain calculation unit 1401 determines for each pixel coordinate of the input visible light image data whether or not it is a red subject pixel. This can be determined using a known method based on the hue obtained from the pixel value.

When the color saturation correction adjustment gain calculation unit 1401 determines not to perform color saturation correction adjustment for a pixel coordinate determined not to be a red subject, the adjustment gain for taking into account the spectral characteristic is set to times 1. Also, for a pixel coordinate determined to be a read subject, the color saturation correction adjustment gain calculation unit 1401 further determines whether or not the value of the G component is equal to or greater than a threshold B.

When a signal value G(x, y) at the image coordinates (x, y) is determined to be equal to or greater than the threshold B, since this is a red subject near the wavelength of G, the color saturation correction adjustment gain calculation unit 1401 determines not to perform color saturation correction adjustment and sets the adjustment gain to times 1. The adjustment gain determined by the color saturation correction adjustment gain calculation unit 1401 is an adjustment gain that takes into account the spectral characteristics of the image sensor or more specifically a case where the R pixel has sensitivity with respect to the wavelength of infrared light.

When the signal value G(x, y) at the image coordinates (x, y) is determined to be less than the threshold B, the color saturation correction adjustment gain calculation unit 1401 determines an adjustment gain for taking into account the spectral characteristics. Here, the color saturation correction adjustment gain calculation unit 1401 determines the adjustment gain including a value corresponding to the magnitude of the difference (IR−R) between the pixel value of the infrared image at the image coordinates (x, y) and the R component of the pixel value of the visible image.

Figure 16:
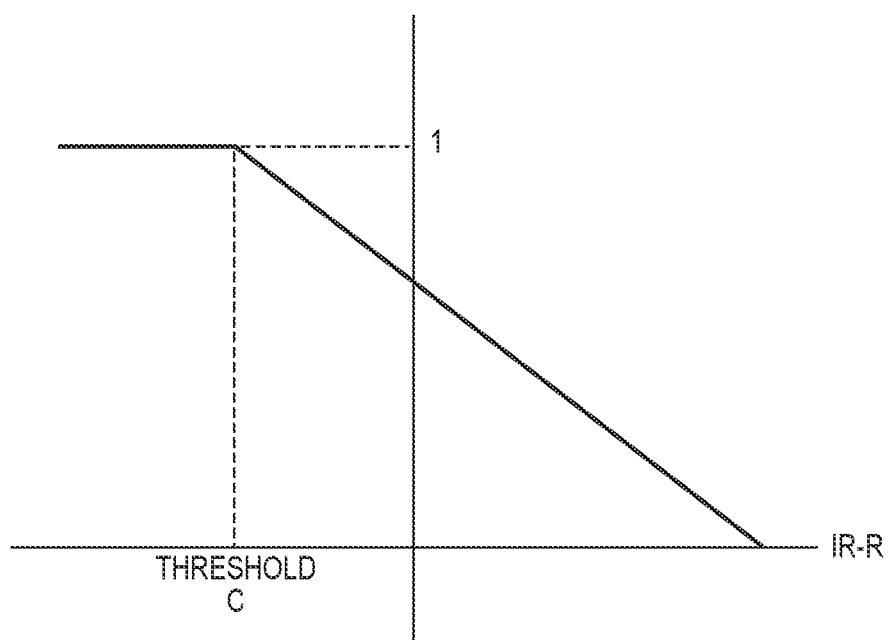
FIG. 16 is a diagram illustrating an example of the adjustment gain for taking into account spectral characteristics according to the second embodiment.

FIG. 16 is a diagram illustrating an example of the relationship between the adjustment gain for taking into account spectral characteristics and the IR−R. The color saturation correction adjustment gain calculation unit 1401 can determine the adjustment gain for each target pixel by using a table in which a plurality of discrete value for IR−R and adjustment gains are associated together and the relationship illustrated in FIG. 16 is registered in advance. Note that the adjustment gain may be determined using a different method without using the table by using a function indicating the relationship between IR−R and adjustment gain or the like.

As illustrated in FIG. 16, in the section where the value of the difference IR−R between the pixel value of the infrared image and the R component value of the visible light image is equal to or less than a predetermined threshold C, the adjustment gain is times 1 (set so there is essentially no adjustment). This is because the pixels corresponding to this section are subjects that do not include many IR signals. On the other hand, in the section where the value is greater than the threshold C, the value of the adjustment gain linearly decreases as the IR−R increases. This is thought to be because, in the section where the value of the IR−R increases, the amount of the IR component included in the R component value of the visible light image data also increases.

The color saturation correction adjustment gain calculation unit 1401 determines the color saturation correction adjustment gain by adjusting the color saturation correction gain calculated in step S901 via the adjustment gain for taking into account the spectral characteristics. The color saturation correction adjustment gain calculation unit 1401 can determine the color saturation correction adjustment gain as in Equation 8 below, for example.

$$S\_gain\_adj\_gain(x,y) = S\_gain(x,y) \times gain(x,y) \quad \text{Equation 8}$$

Here, S_adj_gain(x, y) is the color saturation correction adjustment gain at the image coordinates (x, y), and S_gain (x, y) is the color saturation correction gain before adjustment at the image coordinates (x, y). Also, gain(x, y) is the adjustment gain for taking into account the spectral characteristics at the image coordinates (x, y).

Also regarding the adjustment gain for taking into account the spectral characteristics, smoothing can be applied in a similar manner to the color saturation correction gain in the first embodiment. Specifically, first, for the image coordinates (x, y) of the visible light image, the weighting of a spatial filter is calculated so that the more the signal values are alike, the more the weighting increases. Also, by applying a spatial filter to the adjustment gain for taking into account the spectral characteristics obtained for the pixel coordinates (x, y), the adjustment gain for taking into account the spectral characteristics is weighted and smoothed. In this manner, posterization within subject area with the same color after color saturation correction can be suppressed.

In step S1502, the color saturation correction unit 1402 performs color saturation correction by applying the color saturation correction adjustment gain determined in step S1501 to the color components of the visible light image data separated in step S401. The color saturation correction unit 1402 can perform color saturation correction using the S_gain_adj_gain(x, y) instead of the S_gain(x, y) in Equation 3 described in the first embodiment.

By adjusting the color saturation correction gain based on the AC component of the infrared image taking into account the difference between the R component value and the IR component value, even when the R pixel of the image sensor has sensitivity with respect to infrared light, the color saturation correction for a red color subject can be appropriately performed.

In the first embodiment, by adjusting the component of the invisible light image to be combined with the visible light image taking into account the tone characteristics of areas where the invisible light image is not to be combined, an unnatural difference in the tone characteristics between an area where the component of the invisible light image is to be combined and an area where this is not to be combined is suppressed. However, in the present embodiment, by applying the tone correction taking into account the tone characteristics of areas where the component of the invisible light image is not to be combined after the component of the invisible light image is combined, an unnatural difference in the tone characteristics between an area where the component of the invisible light image is to be combined and an area where this is not to be combined is suppressed.

Third Embodiment

Next, a third embodiment of the present disclosure will be described. The present embodiment is similar to the first and second embodiments in that when information extracted on the basis of the infrared image is used to apply a process that affects the tone characteristics to the visible light image, unnaturalness in the relationship of the tone characteristics that may occur between areas to which the process with different strengths have been applied is suppressed. Note that in the present embodiment, the functional configurations and operations are the same as that in the first embodiment with the exception of that of the image processing circuit 107, and thus the description of the configurations and operations shared with the first embodiment will be omitted or simplified.

Figure 17:
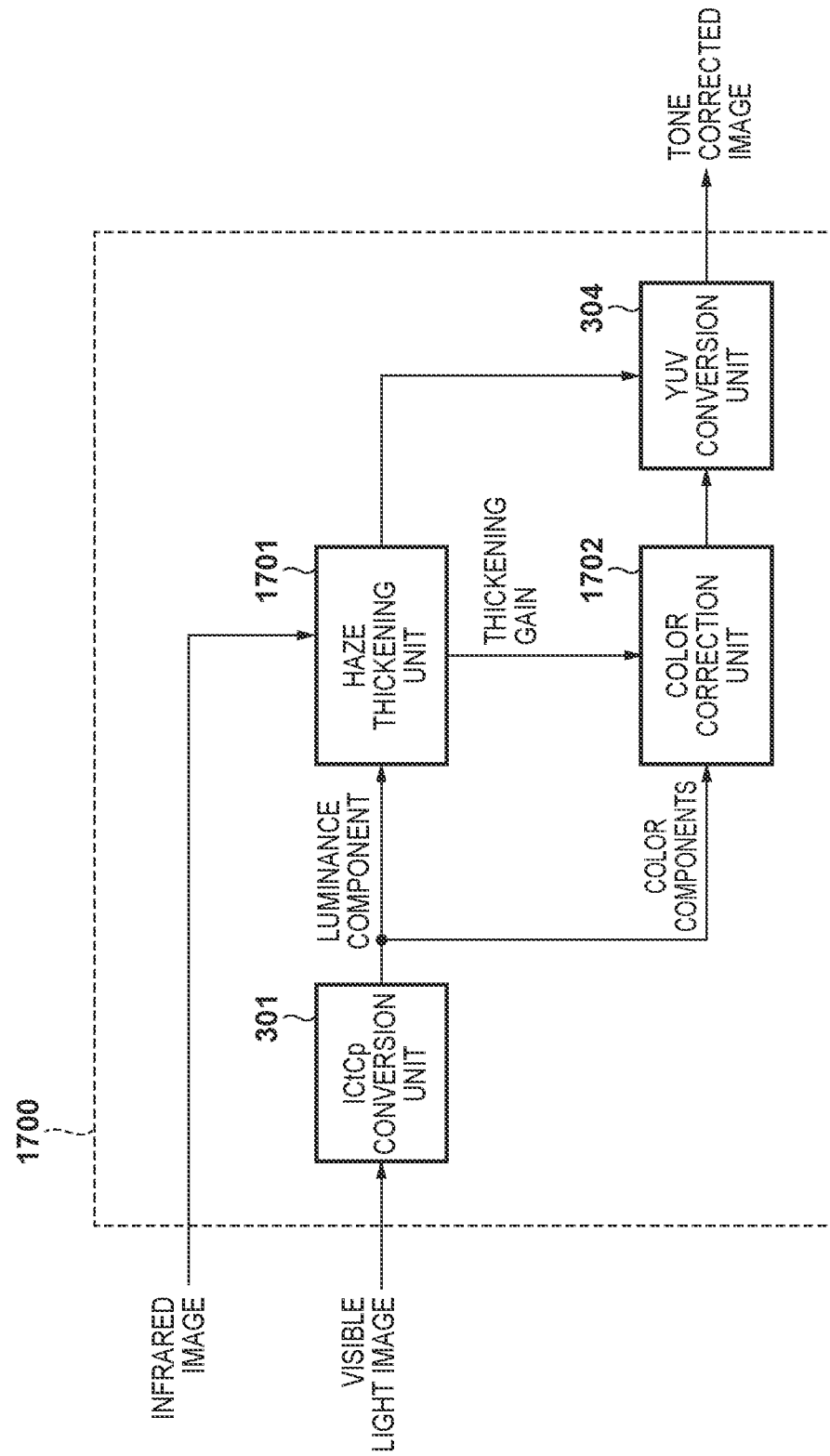
FIG. 17 is a block diagram illustrating an example of the functional configuration of a tone correction unit according to a third embodiment.

In the example described below, the luminance component extracted on the basis of the infrared image is a haze component and the process is accentuation (thickening) of the haze component. However, no such limitation is intended. FIG. 17 is a functional block diagram schematically illustrating the image processing circuit 107 when executing haze thickening processing as a tone correction unit 1700 for the purpose of describing the accentuation processing of the haze component (haze thickening processing). However, the functional blocks included in the tone correction unit 1700 are actually a portion of the functions implemented by the image processing circuit 107. The tone correction unit 1700 includes the ICtCp conversion unit 301, a haze thickening unit 1701, a color correction unit 1702, and the YUV conversion unit 304. In FIG. 17, the functional blocks that are similar to those in the tone correction unit 300 described in the first embodiment are given the same reference numbers used in FIG. 3.

Figure 18:
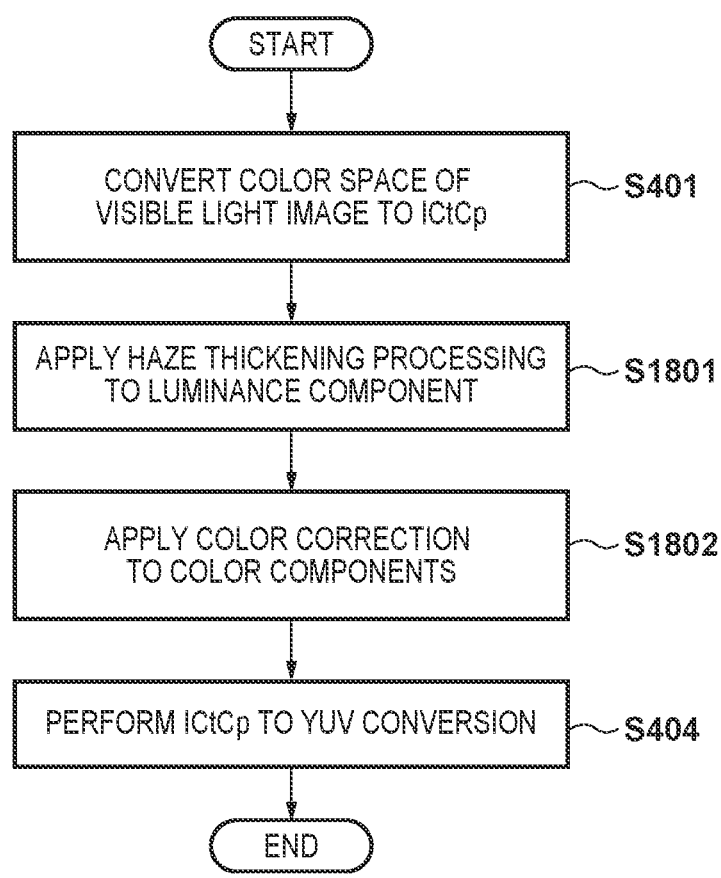
FIG. 18 is a flowchart relating to the operations of the tone correction unit according to the third embodiment.

Next, the haze thickening processing applied to a visible light image by the tone correction unit 1700 will be described using the flowchart of FIG. 18. Here, the visible light image data and the infrared light image data input to the tone correction unit 1700 may correspond to data captured by the image capture unit 105 and supplied via the A/D converter circuit 106 or the like or may correspond to data read out from the recording circuit 108. The visible light image data and the infrared light image data used in the haze thickening processing is image data of the same scene captured at the same time or sufficiently close to the same time. In FIG. 18, the processes for performing operations that are the same as that performed by the tone correction unit 300 described in the first embodiment are given the same reference numbers used in FIG. 4.

In step S401, the ICtCp conversion unit 301 converts the color space (for example, YUV color space) of the visible light image data to ICtCp color space. The ICtCp conversion unit 301 also separates the visible light image data converted to the ICtCp format into an I component indicating the brightness (luminance) component and Ct and Cp components indicating the color components. The ICtCp conversion unit 301 outputs the I component to the haze thickening unit 1701 and the CtCp component to the color correction unit 1702.

In step S1801, for the I component (luminance component) of the visible light image data, the haze thickening unit 1701 thickens the haze on the basis of the infrared light image data and thus degrades the tone characteristics (or reduces the contrast) of the visible light image data and increases the brightness. The I component obtained via tone correction of the visible light image data is output to the YUV conversion unit 304 by the haze thickening unit 1701. Also, the haze thickening unit 1701 outputs the thickening gain used in correction of the color components to the color correction unit 1702. The haze thickening processing executed by the haze thickening unit 1701 will be described below in detail.

In step S1802, the color correction unit 1702 applies a color correction processing to the Ct and Cp components (color components) of the visible light image data on the basis of the thickening gain. The color correction processing executed by the color correction unit 1702 will be described below in detail.

Next, the operations of the haze thickening unit 1701 will be described in detail.

Figure 19:
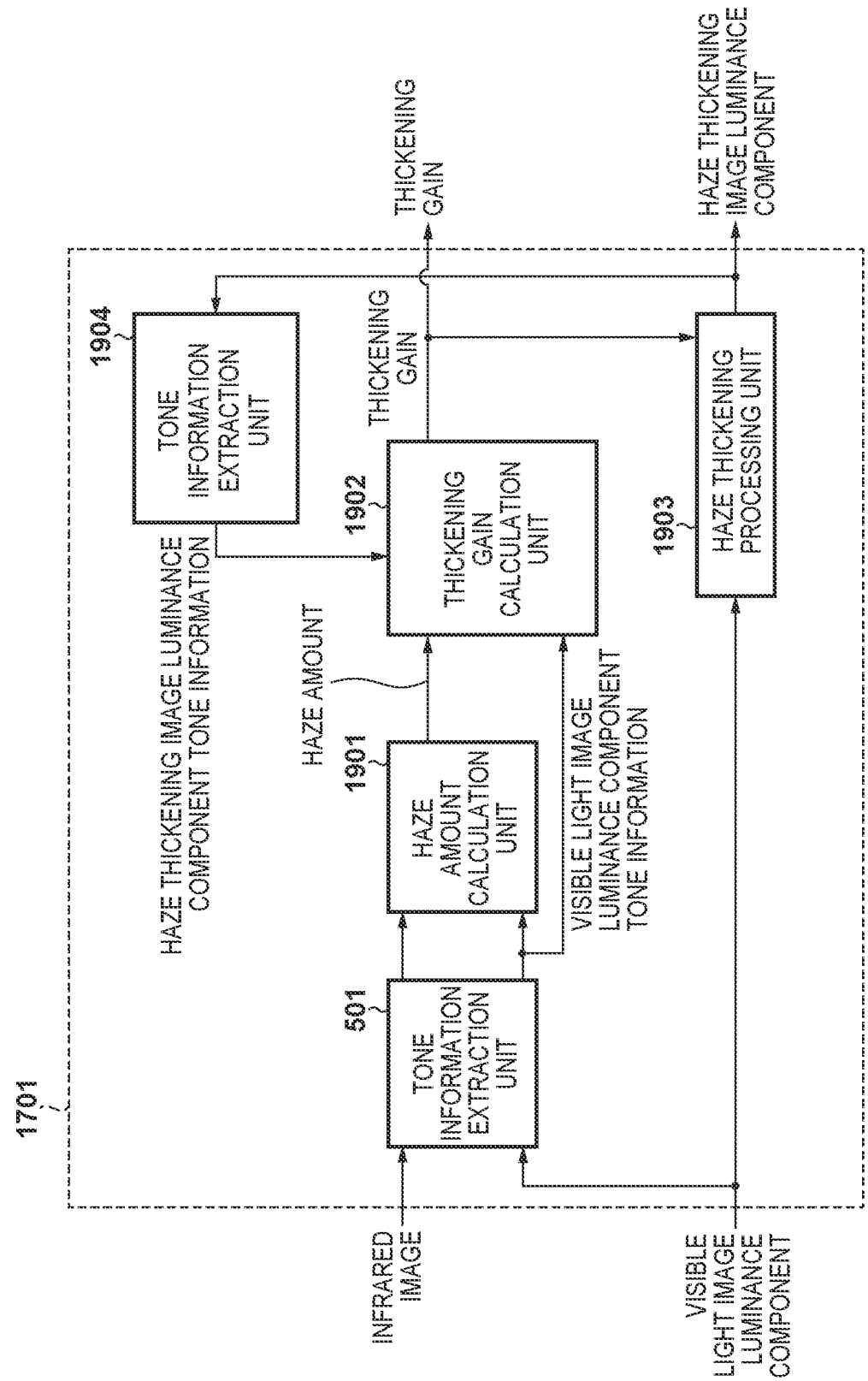
FIG. 19 is a block diagram illustrating an example of the functional configuration of a haze thickening unit according to the third embodiment.

FIG. 19 is a block diagram illustrating an example of the functional configuration of the haze thickening unit 1701. The haze thickening unit 1701 includes the tone information extraction unit 501, a haze amount calculation unit 1901, a thickening gain calculation unit 1902, a haze thickening processing unit 1903, and a tone information extraction unit 1904. These functional blocks are also schematically illustrated functions implemented by the image processing circuit 107. The tone information extraction unit 501 is the same as that described using FIG. 3.

Figure 20:
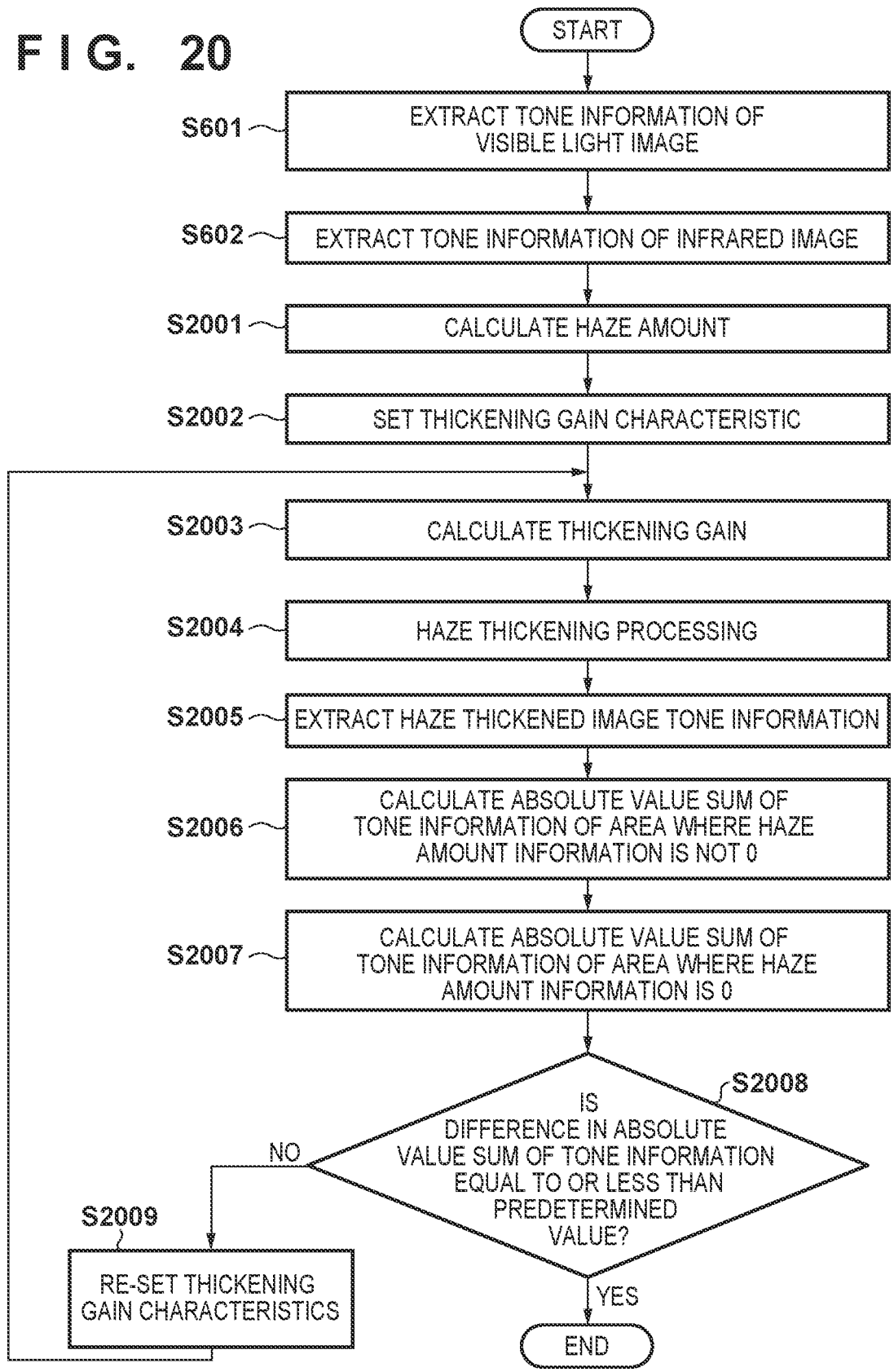
FIG. 20 is a flowchart relating to the operations of the haze thickening unit according to the third embodiment.

Next, the operations of the haze thickening unit 1701 will be described in detail with reference to the flowchart of FIG. 20. In FIG. 20, the processes for performing operations that are the same as that performed by the luminance enhancement unit 302 of the first embodiment are given the same reference numbers used in FIG. 6.

Steps S601 and S602 are as described in the first embodiment and thus description thereof is omitted. Note that the tone information extraction unit 501 outputs the tone information extracted in steps S601 and S602 to the haze amount calculation unit 1901. Also, the tone information extraction unit 501 also outputs the tone information of the visible light image extracted in step S601 to the thickening gain calculation unit 1902.

In this example, the image illustrated in FIG. 7A is an example of an image represented by the visible light image data before application of the haze thickening processing. Also, the image illustrated in FIG. 7B is an example of an image represented by the infrared light image data used in the haze thickening processing of the visible light image data illustrated in FIG. 7A.

As in the first embodiment, the tone information extraction unit 501 applies space band-pass filter processing and extracts the tone information (AC component) from two such images. Note that the haze thickening processing according to the present embodiment includes accentuating the degradation of the tone characteristics caused by mist and haze and further degrading the tone characteristics of the area L701 in the visible light image illustrated in FIG. 7A. With the haze thickening processing, for example, the appearance of thick mist and haze can be used to produce a dreamlike effect.

In step S2001, the haze amount calculation unit 1901 calculates the haze amount on the basis of the tone information extracted by the tone information extraction unit 501 from the visible light image data (luminance component) and the infrared light image data. The haze amount includes a significant value for the area where there is haze and a significant value for the area where there is no haze.

Specifically, the haze amount calculation unit 1901 outputs the absolute value of the difference between the tone information of the visible light image data (luminance component) and the tone information of the infrared light image data as the haze amount. However, the haze amount is calculated per pixel. Note that for the areas where the difference absolute value is equal to or less than a predetermined threshold, the haze amount may be output as a predetermined fixed value (for example, 0). Note that the threshold can be empirically determined in advance, for example.

For example, since there is haze in the area L701 in FIGS. 7A and 7B, the absolute value of the difference between the tone information of the visible light image data (luminance component) and the tone information of the infrared light image data is great. However, since there is no haze in the area L702 in FIGS. 7A and 7B, the absolute value of the difference between the tone information of the visible light image data (luminance component) and the tone information of the infrared light image data is small. Thus, the haze amount calculation unit 1901 outputs the large value for the haze amount for the area L701 and outputs the small value (for example, 0) for the haze amount for the area L702.

Figure 21A:
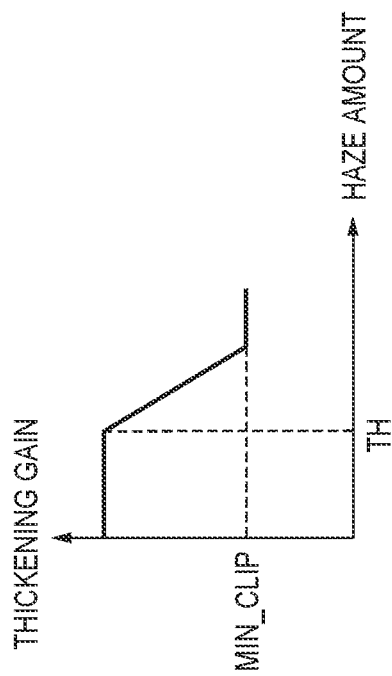
FIGS. 21A and 21B are diagrams illustrating examples of thickening gain characteristics according to the third embodiment.
Figure 21B:
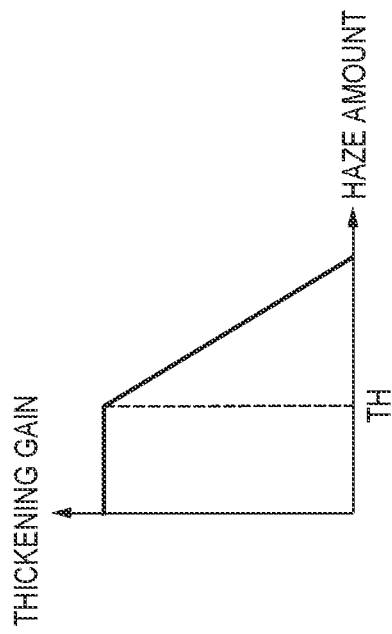

In step S2002, the thickening gain calculation unit 1902 sets the haze amount thickening gain characteristic. The thickening gain characteristic represents the relationship between the haze amount and the thickening gain. FIGS. 21A and 21B are diagrams illustrating examples of the thickening gain characteristic. The thickening gain characteristic illustrated in FIG. 21A is a characteristic where in a range in which the haze amount is 0 or equal to or less than a predetermined threshold TH, the thickening gain is equal in scale, and in a range in which the haze amount is greater than the threshold TH, the thickening gain linearly decreases as the haze amount increases. The thickening gain indicates the strength of the haze amount thickening processing, and when this is equal in scale, the strength is 0 (no effect on the haze amount) and when this is less than equal in scale, the strength is greater than 0 (haze amount is accentuated). Thus, with the thickening gain characteristic illustrated in FIG. 21A, when the haze amount is the maximum, the strength of the thickening processing is also at the maximum.

The thickening gain characteristic illustrated in FIG. 21B is similar to the thickening gain characteristic illustrated in FIG. 21A, except that the lower limit value of the thickening gain is increased. When setting the thickening gain characteristic of FIG. 21B, the maximum strength of the haze thickening processing can be set weaker than when setting the thickening gain characteristic of FIG. 21A.

Note that the thickening gain characteristics illustrated in FIGS. 21A and 21B are only examples and other characteristics may be used. For example, a nonlinear thickening gain characteristic may be used. Also, the thickening gain set by the thickening gain calculation unit 1902 may be selectable by a user or may be automatically set. For example, a plurality of thickening gain characteristics with different maximum strengths may be prepared, and the user may select the thickening gain characteristic depending on the desired maximum strength. Also, different thickening gain characteristics for different image capture scenes may be prepared, and when a shooting mode with a specific scene as a target as set, the thickening gain calculation unit 1902 may set the thickening gain characteristic according to the scene.

In step S2003, the thickening gain calculation unit 1902 determines the thickening gain per pixel by applying the haze amount calculated per pixel to the thickening gain characteristic. The thickening gain calculation unit 1902 can determine the thickening gain depending on the haze amount by referencing a table corresponding to thickening gain characteristics, for example.

In the table, for the discrete values of the haze amounts, the correction gains corresponding to the thickening gain characteristics are associated together and registered. The thickening gain calculation unit 1902 reads out the thickening gain corresponding to the two values closest to the value of the haze amount from the table and can determine the thickening gain corresponding to the value of the haze amount via linear interpolation. Note that a function may be stored instead of a table. The thickening gain calculation unit

1902 outputs the obtained thickening gain to the haze thickening processing unit 1903 and the color correction unit 1702.

In step S2004, the haze thickening processing unit 1903 applies the haze thickening processing to the luminance component of the visible light image data on the basis of the thickening gain and generates a haze thickened image. The haze thickening processing unit 1903 outputs the luminance component after the haze thickening processing to the tone information extraction unit 1904 and the YUV conversion unit 304.

The haze thickening processing can be represented by Equation 9 below.

$$I_{out}(x,y) = F\_TGT - F\_GAIN(x,y) \times (F\_TGT - I_{in}(x,y)) \quad \text{Equation 9}$$

$I_{in}(x, y)$ is the luminance component of the visible light image data before the haze thickening processing at the image coordinates $(x, y)$, $F\_GAIN(x, y)$ is the thickening gain at the coordinates $(x, y)$, and $F\_TGT$ is a target value for the haze amount set in advance. Also, $I_{out}(x, y)$ represents the luminance component of the visible light image data after the haze thickening processing at the coordinates $(x, y)$.

Figure 22A:
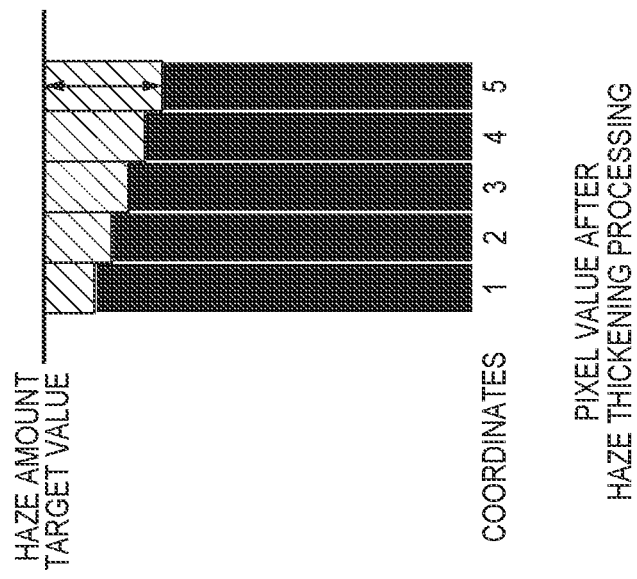
FIGS. 22A and 22B are diagrams schematically illustrating change in pixel values caused by haze thickening processing according to the third embodiment.
Figure 22B:
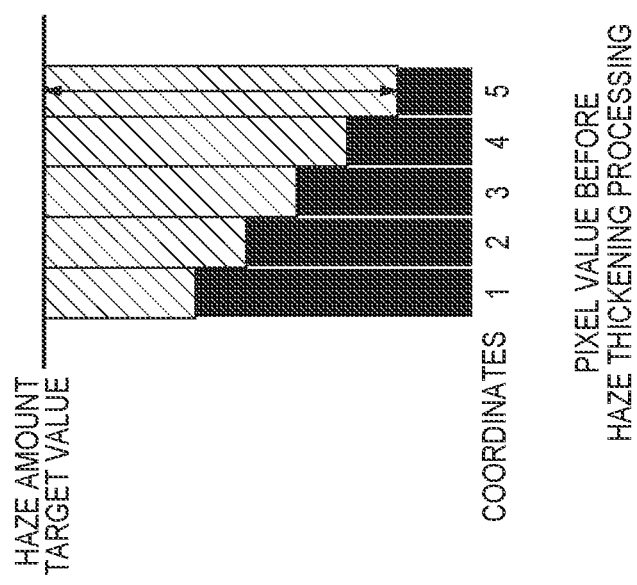

FIG. 22A is a diagram illustrating an example of the pixel values before haze thickening processing, and FIG. 22B is a diagram illustrating an example of pixel values after haze thickening processing. The haze thickening processing unit 1903 calculates a value obtained by subtracting a value obtained by applying the thickening gain to the difference (the hatched portion in FIG. 22A) between the pixel values of the visible light image data and the target values of the haze amount from the target values of the haze amount and takes this value as the pixel values after haze thickening processing. By executing such haze thickening processing, tone correction is performed so that the pixel values between the coordinates 1 to 5 section are given lower contrast and are made brighter. Thus, an effect of thickening the haze can be produced. Note that the target value of the haze amount can be empirically determined in advance, for example.

In step S2005, the tone information extraction unit 1904 extracts the tone information of the luminance component of the haze thickened image. The tone information extraction unit 1904 outputs the extracted tone information to the thickening gain calculation unit 1902. The method for extracting the tone information is similar to that used by the tone information extraction unit 501 described in the first embodiment, and thus description thereof is omitted.

In step S2006, the thickening gain calculation unit 1902 (6) calculates the absolute value sum of the tone information, from among the tone information extracted from the haze thickened image data (luminance component), extracted from the area corresponding to the area L701 where the haze amount information is not 0. This corresponds to the absolute value sum of the tone information extracted from the area, in the haze thickened image, where the strength of the haze thickening processing is not 0.

In step S2007, the thickening gain calculation unit 1902 (7) calculates the absolute value sum of the tone information, from among the tone information extracted from the visible light image data (luminance component), extracted from the area corresponding to the area L702 where the haze amount information is 0. This corresponds to the absolute value sum of the tone information extracted from the area, in the haze thickened image, where the strength of the haze thickening processing is 0.

In step S2008, the thickening gain calculation unit 1902 determines whether or not the difference between (6) and (7) is equal to or less than a predetermined value set in advance and ends the haze thickening processing if the difference is determined to be equal to or less than the predetermined value and executes step S2009 if this is not determined.

Step S2009 is executed when the difference between (6) and (7) is greater than the predetermined value. In this case, since the tone characteristics of the area where the haze thickening processing has been executed and the tone characteristics of the area where the haze thickening processing has not been executed are significantly different, the image overall may look unnatural and unbalanced. In step S2009, the thickening gain calculation unit 1902 re-sets the thickening gain characteristic for weakening the strength of the haze thickening processing. Thereafter, by re-executing the processing of steps S2003 to S2007, a haze thickened image is re-generated with a suppressed difference in the tone characteristics between the area where the haze thickening processing has been applied and the area where the haze thickening processing has not been applied.

The thickening gain characteristic re-set in step S2009 may be a thickening gain characteristic such as that illustrated in FIG. 21B, for example. For example, a plurality of thickening gain characteristics with different maximum strengths may be prepared, and the thickening gain characteristic can be set so that each time step S2009 is executed the maximum strength is incrementally weakened.

By executing the processing as described above, the haze thickening unit 1701 outputs the thickening gain and the luminance component of the haze thickened image of when the final difference between the (6) and (7) is equal to or less than the predetermined value.

Note that the thickening gain calculation unit 1902 may change the adjustment gain depending on the subject distance. As the distance to the subject increases, the degradation in visibility and contrast due to the effects of haze increases. Thus, the adjustment gain may be changed so that, as the subject distance in the area where the haze thickening processing is applied increases, the thickening gain is decreased. In this manner, a natural decrease in the visibility or contrast can be produced with the haze growing thicker the further away the subject is.

Next, the color correction unit 1702 will be described in detail. FIG. 23 is a block diagram illustrating an example of the functional configuration of the color correction unit 1702. The color correction unit 1702 includes a color saturation correction gain calculation unit 2301 and a color saturation correction unit 2302.

Figure 24:
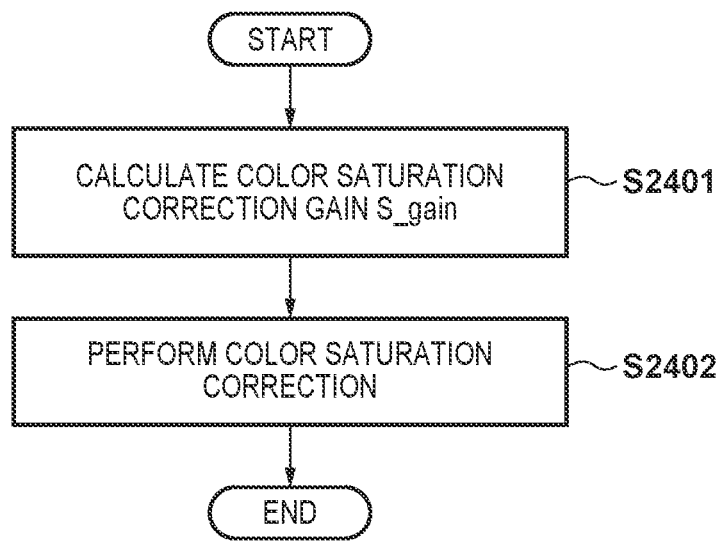
FIG. 24 is a flowchart relating to the operations of the color correction unit according to the third embodiment.

The operations by the color correction unit 1702 to correct the color components of the visible light image data using the thickening gain will be described in detail using the flowchart illustrated in FIG. 24.

In step S2401, the color saturation correction gain calculation unit 2301 determines the color saturation correction gain S_gain using the thickening gain. The operations of the color saturation correction gain calculation unit 2301 will be described below in detail.

In step S2402, the color saturation correction unit 2302 applies color saturation correction processing using the color saturation correction gain S_gain determined in step S2401 to the color components (Ct and Cp components) of the visible light image data output by the ICtCp conversion unit 301 in step S401. In this manner, color correction processing suitable for the strength of the haze thickening processing applied to the luminance component can be applied. As in the first embodiment, the color saturation correction processing can be executed according to Equation 3. The color saturation correction unit 2302 outputs signal values Ct' and Cp' of the color components after the color saturation correction processing to the YUV conversion unit 304.

Next, the operations of the color saturation correction gain calculation unit 2301 will be described in detail. The color saturation correction gain calculation unit 2301 can determine the color saturation correction gain corresponding to the thickening gain by referencing a color saturation correction table corresponding to the color saturation gain characteristic, for example.

Figure 25:
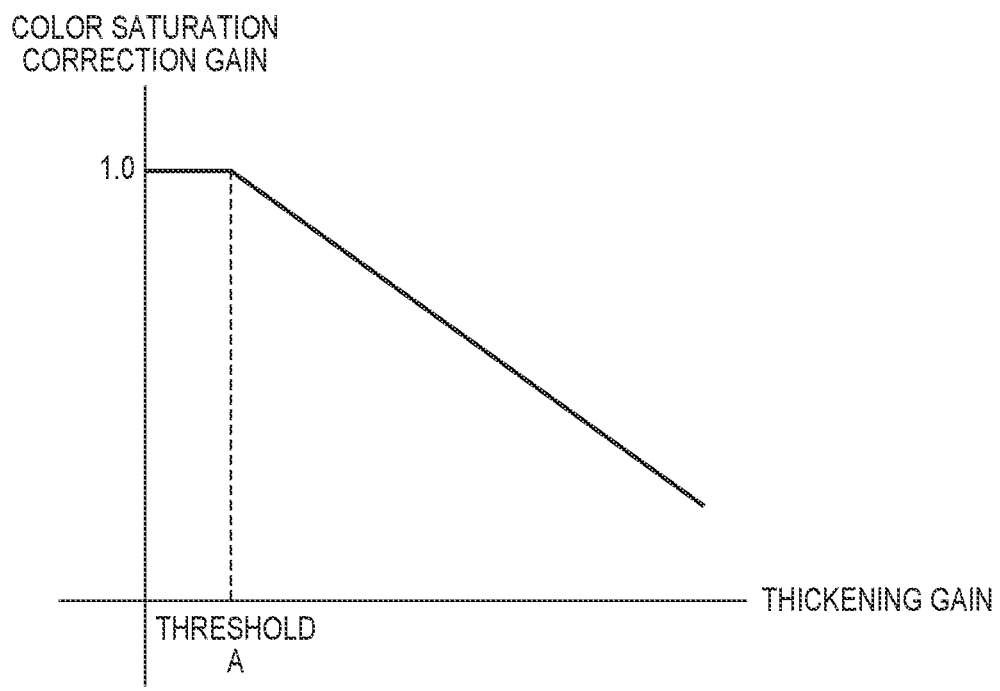
FIG. 25 is a diagram illustrating an example of a color saturation gain characteristic according to the third embodiment.

FIG. 25 is a diagram illustrating an example of the color saturation gain characteristic. The color saturation gain characteristic represents the relationship between the thickening gain and the color saturation correction gain. The thickening gain obtained in step S2003 is represented on the horizontal axis, and the color saturation correction gain is represented on the vertical axis.

With the color saturation gain characteristic illustrated in FIG. 25, in the section where the thickening gain is equal to or less than a threshold A set in advance, the color saturation correction gain is times 1 (×1.0), and the color components are essentially not corrected. Also, in the section where the thickening gain is greater than the threshold A, the value of the color saturation correction gain linearly decreases as the thickening gain increases. When the color saturation correction gain is less than times 1, the color saturation correction unit 2302 executes correction processing to perform color correction to lower the color saturation.

In the color saturation correction table, discrete values of the thickening gain are associated with the color saturation correction gain satisfying the relationship illustrated in FIG. 25 and registered. The color saturation correction gain calculation unit 2301 can read out from the table the color saturation correction gain corresponding to the two values closest to the value of the thickening gain and determine the color saturation correction gain corresponding to the value of the thickening gain via linear interpolation. Note that a function may be stored instead of a table.

Note that a table may be used in which the color saturation correction gain corresponding to the absolute value of the difference in the I components before and after application of the haze thickening processing or corresponding to a ratio thereof are registered instead of the thickening gain.

According to the present embodiment, when a visible light image is processed using information obtained using an invisible light image, unnaturalness in the relationship of the tone characteristics that may occur between areas to which a process with different strengths have been applied can be suppressed.

Other Embodiments

Embodiment(s) of the present disclosure can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors, circuitry, or combinations thereof (e.g., central processing unit (CPU), micro processing unit (MPU), or the like), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2021-205466, filed on Dec. 17, 2021 and No. 2022-167112, filed on Oct. 18, 2022, which are hereby incorporated by reference herein in their entirety.

What is claimed is:

1. An image processing apparatus comprising:
one or more processors that execute a program stored in a memory and thereby function as:
a determining unit configured to determine an area in a visible light image where an invisible light image is to be combined; and
a combining unit configured to combine the invisible light image with the visible light image based on a determination to generate a combined image,
wherein the combining unit adjusts the invisible light image so that, in the combined image, a difference between tone information in an area where the invisible light image has been combined and the tone information in an area where the invisible light image has not been combined is equal to or less than a predetermined first threshold, and combines the adjusted invisible light image and the visible light image.

2. The image processing apparatus according to claim 1, wherein the combining unit adjusts the invisible light image so that, in the combined image, a difference between tone information in an area where the invisible light image has been combined and a particular type of subject is included and the tone information in an area where the invisible light image has not been combined and the particular type of subject is included is equal to or less than a predetermined threshold, and combines the adjusted invisible light image with the visible light image.

3. The image processing apparatus according to claim 1, wherein the combining unit further adjusts the invisible light image depending on a subject distance, and combines the adjusted invisible light image with the visible light image.

4. The image processing apparatus according to claim 1, wherein the combining unit combines the invisible light image that has not been adjusted with the visible light image, and
wherein the one or more processors further function as a correcting unit configured to correct contrast of the combined image so that a difference between tone information in an area where the invisible light image has been combined and the tone information in an area where the invisible light image has not been combined is equal to or less than the first threshold.

5. The image processing apparatus according to claim 1, wherein the determining unit determines an area in the visible light image where the tone information is equal to or less than a second threshold to be an area where the invisible light image is to be combined.

6. The image processing apparatus according to claim 1, wherein the combining unit combines the invisible light image with a luminance component of the visible light image.

7. The image processing apparatus according to claim 6, wherein the luminance component is a luminance component when the visible light image is represented in a uniform color space.

8. The image processing apparatus according to claim 7, wherein the uniform color space is ICtCp color space or L*a*b* color space.

9. The image processing apparatus according to claim 1, wherein the one or more processors further function as:
a correcting unit configured to correct a color component of the visible light image.

10. The image processing apparatus according to claim 9, wherein the correcting unit corrects the color component based on tone information of the invisible light image.

11. The image processing apparatus according to claim 9, wherein the correcting unit adjusts a correction amount of the color component depending on pixel values before and after the adjusted invisible light image is combined.

12. The image processing apparatus according to claim 9, wherein the correcting unit adjusts a correction amount of the color component depending on exposure conditions when the visible light image is captured.

13. The image processing apparatus according to claim 9, wherein the correcting unit adjusts a correction amount of the color component depending on whether or not an infrared auxiliary light is irradiated when the visible light image is captured.

14. The image processing apparatus according to claim 9, wherein the correcting unit adjusts a correction amount of the color component depending on a subject distance.

15. The image processing apparatus according to claim 9, wherein the correcting unit performs adjustment so that a difference in correction amounts between areas including similar colors in the visible light image is equal to or less than a third threshold.

16. The image processing apparatus according to claim 15, wherein the correcting unit performs the adjustment by smoothing correction amounts for areas including similar colors in the visible light image.

17. The image processing apparatus according to claim 9, wherein the correcting unit adjusts a correction amount for a pixel of a red color subject from among pixels of the visible light image based on a difference in pixel values with a corresponding pixel of the invisible light image.

18. An image capture apparatus comprising:
an image capturing unit including an image sensor and for acquiring a visible light image and an invisible light image; and
an image processing apparatus that uses the visible light image and the invisible light image acquired by the image capturing unit,
wherein the image processing apparatus comprising:
one or more processors that execute a program stored in a memory and thereby function as:
a determining unit configured to determine an area in a visible light image where an invisible light image is to be combined; and
a combining unit configured to combine the invisible light image with the visible light image based on a determination to generate a combined image,
wherein the combining unit adjusts the invisible light image so that, in the combined image, a difference between tone information in an area where the invisible light image has been combined and the tone information in an area where the invisible light image has not been combined is equal to or less than a predetermined first threshold, and combines the adjusted invisible light image and the visible light image.

19. An image processing method executed by an image processing apparatus comprising:
determining an area in a visible light image where an invisible light image is to be combined; and
combining the invisible light image with the visible light image based on a determination to generate a combined image,
wherein the combining includes
adjusting the invisible light image so that, in the combined image, a difference between tone information in an area where the invisible light image has been combined and the tone information in an area where the invisible light image has not been combined is equal to or less than a predetermined first threshold, and
combining the adjusted invisible light image and the visible light image.

20. A non-transitory computer-readable medium storing a program for causing a computer, when executing the program, to function as an image processing apparatus comprising:
a determining unit configured to determine an area in a visible light image where an invisible light image is to be combined; and
a combining unit configured to combine the invisible light image and the visible light image based on a determination to generate a combined image,
wherein the combining unit adjusts the invisible light image so that, in the combined image, a difference between tone information in an area where the invisible light image has been combined and the tone information in an area where the invisible light image has not been combined is equal to or less than a predetermined first threshold, and combines the adjusted invisible light image and the visible light image.

21. An image processing apparatus comprising:
one or more processors that execute a program stored in a memory and thereby function as:
an acquiring unit configured to acquire, based on an invisible light image, information for apply a process to a visible light image corresponding to the invisible light image; and
a correcting unit configured to apply the process to the visible light image at a strength based on the information,
wherein, in the visible light image to which the process has been applied, when a difference between tone information in an area where a strength of the process is 0 and the tone information in an area where a strength of the process is not 0 is greater than a predetermined fourth threshold, the correcting unit corrects a strength of the process so that the difference is equal to or less than the fourth threshold.

* * * * *